(12) United States Patent
Kishikawa et al.

(10) Patent No.: US 10,683,987 B2
(45) Date of Patent: Jun. 16, 2020

(54) LIGHT EMITTING DEVICE, LIGHT IRRADIATION DEVICE INCLUDING THE LIGHT EMITTING DEVICE, AND LIGHT EMITTING UNIT

(71) Applicant: NICHIA CORPORATION, Anan-shi, Tokushima (JP)

(72) Inventors: Daisuke Kishikawa, Anan (JP); Toshihiko Aizawa, Anan (JP); Masato Ono, Sagamihara (JP)

(73) Assignee: NICHIA CORPORATION, Anan-Shi (JP)

( * ) Notice: Subject to any disclaimer, the term of this patent is extended or adjusted under 35 U.S.C. 154(b) by 0 days.

(21) Appl. No.: 15/499,641

(22) Filed: Apr. 27, 2017

(65) Prior Publication Data

US 2017/0314764 A1    Nov. 2, 2017

(30) Foreign Application Priority Data

Apr. 28, 2016  (JP) ................................. 2016-091712
Jul. 21, 2016  (JP) ................................. 2016-143717

(51) Int. Cl.
| | |
|---|---|
| H01L 21/02 | (2006.01) |
| F21V 5/04 | (2006.01) |
| B41J 11/00 | (2006.01) |
| F26B 3/28 | (2006.01) |
| F21V 5/00 | (2018.01) |
| G02B 19/00 | (2006.01) |
| B41F 23/04 | (2006.01) |

(Continued)

(52) U.S. Cl.
CPC ............ *F21V 5/043* (2013.01); *B41F 23/045* (2013.01); *B41J 11/002* (2013.01); *F21V 5/007* (2013.01); *F26B 3/28* (2013.01); *G02B 19/0014* (2013.01); *G02B 19/0066* (2013.01); *F21Y 2103/10* (2016.08); *F21Y 2105/10* (2016.08); *F21Y 2115/10* (2016.08); *G02B 3/005* (2013.01); *G02B 3/0043* (2013.01)

(58) Field of Classification Search
USPC .......................................................... 257/100
See application file for complete search history.

(56) References Cited

U.S. PATENT DOCUMENTS

| | | | |
|---|---|---|---|
| 7,745,840 B2 * | 6/2010 | Wang ...................... | H01L 33/58 257/100 |
| 2006/0186431 A1 * | 8/2006 | Miki ...................... | H01L 33/505 257/100 |
| 2009/0278151 A1 * | 11/2009 | Kim ...................... | H01L 33/507 257/98 |

FOREIGN PATENT DOCUMENTS

| | | |
|---|---|---|
| JP | S63-276287 A | 11/1988 |
| JP | 2011-204397 A | 10/2011 |

* cited by examiner

*Primary Examiner* — Lam S Nguyen
(74) *Attorney, Agent, or Firm* — Foley & Lardner, LLP

(57) ABSTRACT

A light emitting device includes a substrate, a plurality of light emitting elements arranged in three or more rows on the substrate, and a light-transmissive member including a cylindrical lens portion having an array of three or more cylindrical lenses arranged parallel to each other along the rows of the light emitting elements so that each of the cylindrical lenses is on one of the three or more rows of light emitting elements. The rows of the light emitting elements are arranged with substantially uniform intervals. The cylindrical lens portion includes first cylindrical lens portions including at least cylindrical lenses at outermost sides of the array, and a second cylindrical lens portion arranged at an inner side of the first cylindrical lens portions and having a height greatest in the cylindrical lens portion.

18 Claims, 18 Drawing Sheets

(51) Int. Cl.
*F21Y 115/10* (2016.01)
*F21Y 105/10* (2016.01)
*G02B 3/00* (2006.01)
*F21Y 103/10* (2016.01)

LIGHT EMITTING DEVICE, LIGHT IRRADIATION DEVICE INCLUDING THE LIGHT EMITTING DEVICE, AND LIGHT EMITTING UNIT

CROSS-REFERENCE TO RELATED PATENT APPLICATIONS

This application claims priority under 35 U. S. C. § 119 to Japanese Patent Application No. 2016-091712 filed on Apr. 28, 2016, and Japanese Patent Application No. 2016-143717 filed on Jul. 21, 2016. The entire disclosure of these applications are incorporated herein by references in their entireties.

BACKGROUND

1. Technical Field

The present disclosure relates to a light emitting device, a light irradiation device including the light emitting device, and a light emitting unit.

2. Description of the Related Art

Chip-on board (COB) type light emitting devices in which a light emitting diode (hereinafter, may be referred to as an "LED") is used for a light emitting element are known. For example, there has been known a light emitting device including a substrate, a plurality of rows of a plurality of light emitting elements mounted on the substrate, and a light-transmissive sealing member made of a plurality of cylindrical lenses that is connected to each other. Each of the plurality of cylindrical lenses is arranged on a single row of the plurality of light emitting elements.

In such a light emitting device, for example, light emitting elements for emitting light in the ultraviolet region (in the description below, may be referred to as "ultraviolet light") may be mounted, and such a light emitting device may be used as a light irradiation device for resin-curing or printing. It is generally considered preferable for a light-irradiation device of this kind to irradiate an irradiation object such as ink or resin with uniform and intense ultraviolet light to perform curing.

SUMMARY

However, if ink or resin is irradiated at once with intense ultraviolet light, only a surface portion of the ink or resin may be cured while an interior portion thereof may be left insufficiently cured. For this reason, there has been a demand for a light emitting device that has a light intensity distribution curve whose inclination is changed gradually so that the irradiation object is not subjected to sudden irradiation of intense.

According to certain embodiments of the present invention, it is an object to provide a light emitting device including a light-transmissive member having a plurality of cylindrical lens portions arranged parallel with each other, in which inclination of a light intensity distribution curve in the parallel arrangement direction changes gradually. Also, it is another object to provide a light irradiation device in which intensity of light to irradiate to an irradiation object can be gradually changed.

A light emitting device according to certain embodiments of the present embodiment includes: a substrate; a plurality of light emitting elements arranged in three or more rows on the substrate; and a light-transmissive member including a cylindrical lens portion having an array of three or more cylindrical lenses arranged parallel to each other along the rows of the light emitting elements so that each of the cylindrical lenses is on one of the three or more rows of light emitting elements; wherein the rows of the light emitting elements are arranged with substantially uniform intervals, and the cylindrical lens portion includes, first cylindrical lens portions including at least cylindrical lenses at outermost sides of the array, and a second cylindrical lens portion arranged at an inner side of the first cylindrical lens portions and having a height greatest in the cylindrical lens portion.

Further, a light emitting device according to other certain embodiments of the present invention includes: a plurality of light emitting units; and a cylindrical lens portion, each of the plurality of light emitting units comprising: a substrate, a plurality of light emitting elements arranged in at least one row on the substrate in an arrangement direction of the light emitting units, and a light-transmissive member including an array of at least one cylindrical lens arranged parallel to each other along the rows of the light emitting elements so that each of the at least one cylindrical lens is on one of the plurality of rows of light emitting elements, wherein the light emitting device includes the cylindrical lens portion having a total of three or more cylindrical lenses, including: a plurality of first cylindrical lens portions including at least outermost cylindrical lenses of the cylindrical lens portion; and a second cylindrical lens portion arranged at an inner side of the outermost cylindrical lenses and having a height greatest in the cylindrical lens portion.

A light irradiation device according to certain embodiments of the present invention includes a plurality of the light emitting devices. The light irradiation device is configured to irradiate an irradiation object with light emitted from the plurality of the light emitting devices, in which the plurality of light emitting devices are arranged substantially in parallel to the array of the plurality of cylindrical lenses, and the plurality of light emitting devices and the irradiation object are configured to relatively move substantially in parallel to the array of the plurality of cylindrical lenses.

A light emitting unit according to certain embodiments of the present invention includes: a substrate; a plurality of light emitting elements arranged in a plurality of rows of light emitting elements on the substrate; and a light-transmissive member including a cylindrical lens portion including an array of a plurality of cylindrical lenses arranged parallel to each other along the rows of the light emitting elements so that each of the cylindrical lenses is on one of the rows of light emitting elements; wherein the rows of light emitting elements are arranged with substantially uniform intervals, the cylindrical lens portion includes a first cylindrical lens portion, and a second cylindrical lens portion having a height different from a height of the first cylindrical lens portion and is greatest in the cylindrical lens portion, the second cylindrical lens portion arranged at one of outermost sides of the array of the cylindrical lenses.

With the configurations as described above, the light emitting device including the light-transmissive member in which the plurality of cylindrical lens portions are arranged can have a light intensity distribution curve with respect to an arrangement direction of the cylindrical lens portions in which inclination is gradually changed. Also, with the configurations as described above, intensity of light irradiated from the light irradiation device to the irradiation object can be gradually changed.

DETAILED DESCRIPTION

Figure 1:
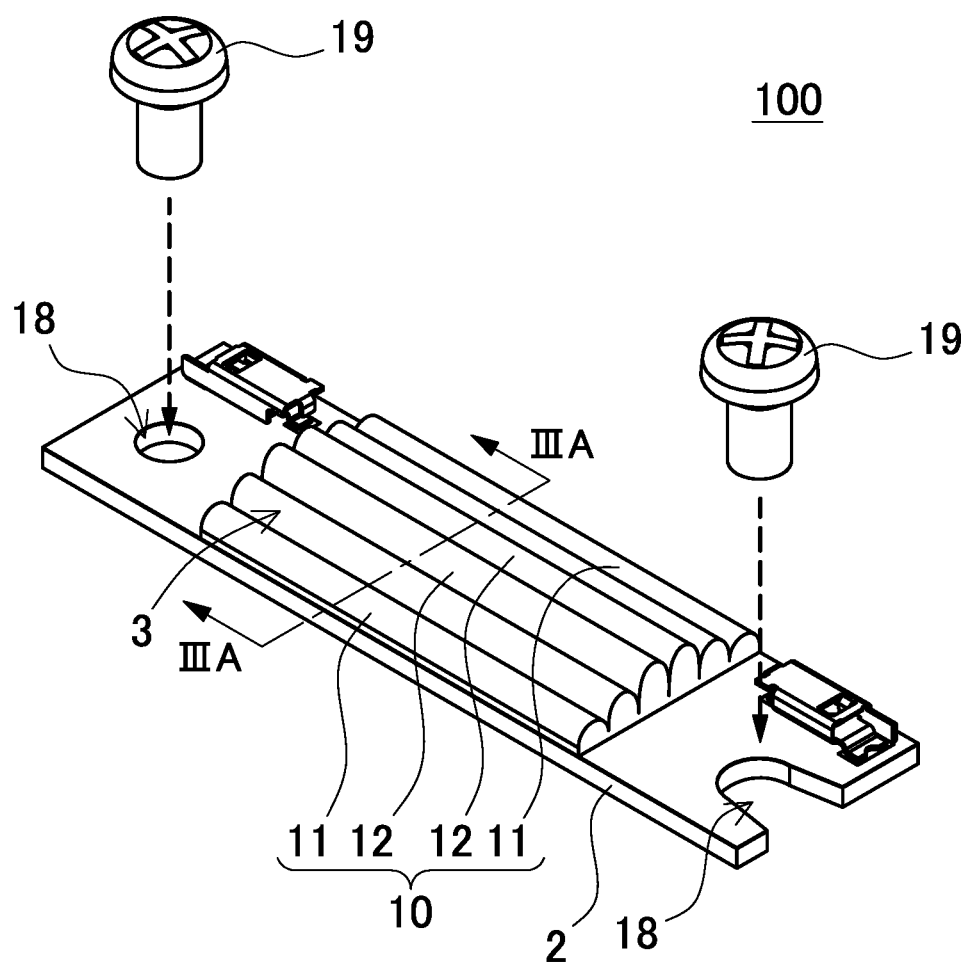
FIG. 1 is a schematic perspective view of a light emitting device according to a first embodiment.

A light emitting device and a light irradiation device including the light emitting device according to certain embodiments will be described with reference to the drawings. The sizes, positional relationships and so on of members shown in the drawings may be exaggerated for clarification of explanations. Further, in the following descriptions, the same names and symbols generally show the same or equivalent members, and detailed descriptions thereof are appropriately omitted. Each component may be applied in combination in embodiments described below.

First Embodiment

Figure 2:
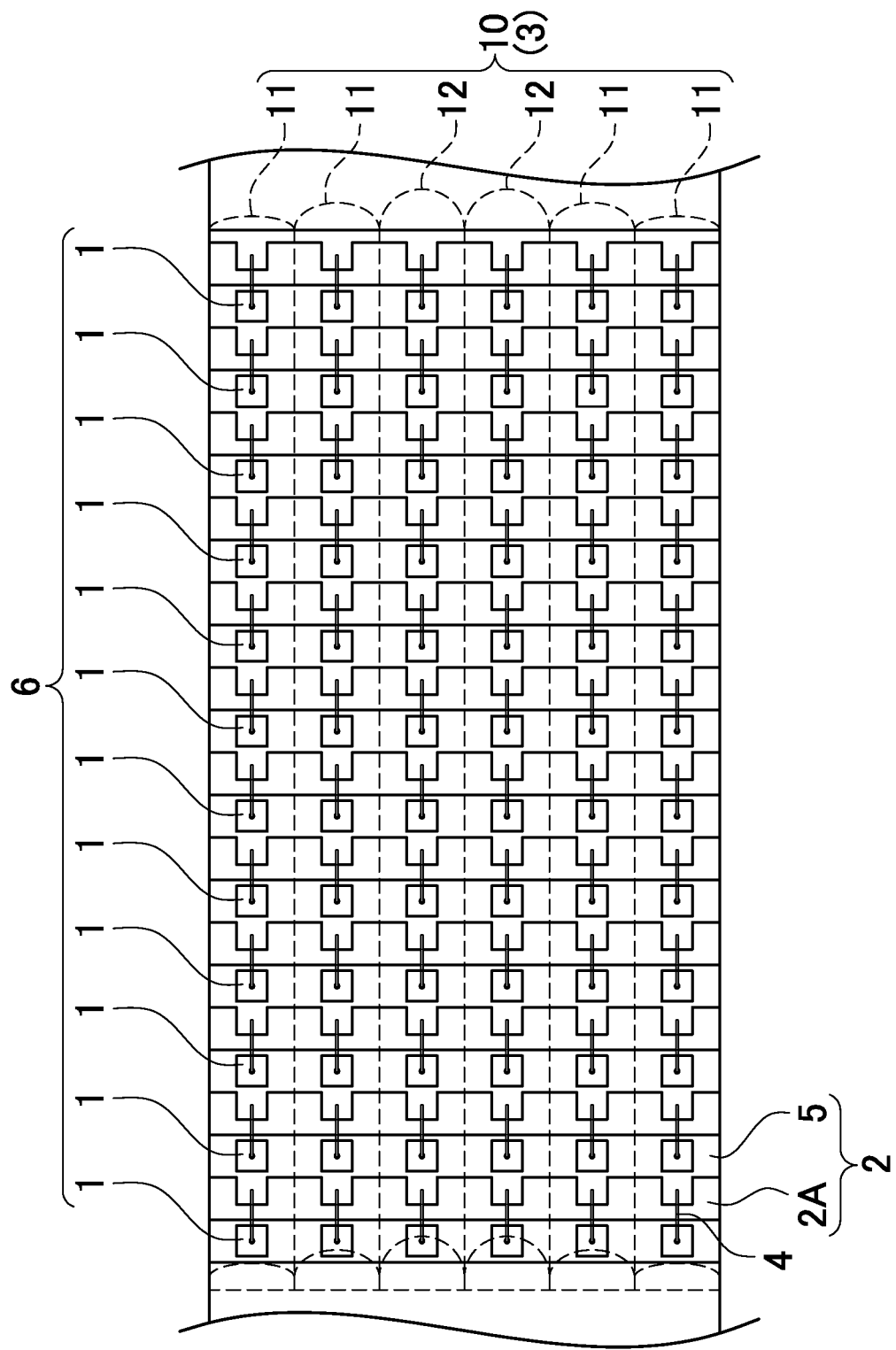
FIG. 2 is a schematic plan view showing an arrangement of a plurality of light emitting elements in the light emitting device shown in FIG. 1.
Figure 3A:
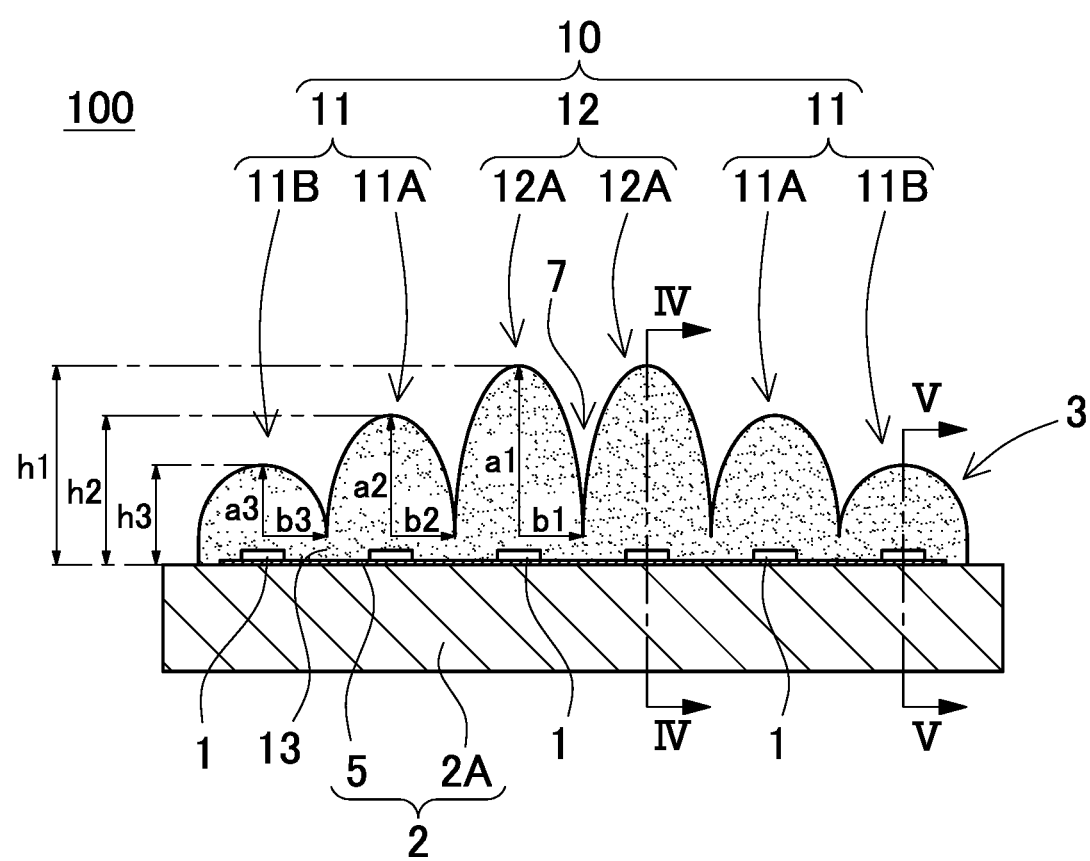
FIG. 3A is a schematic cross-sectional view of the light emitting device shown in FIG. 1 taken along the line IIIA-IIIA.
Figure 3B:
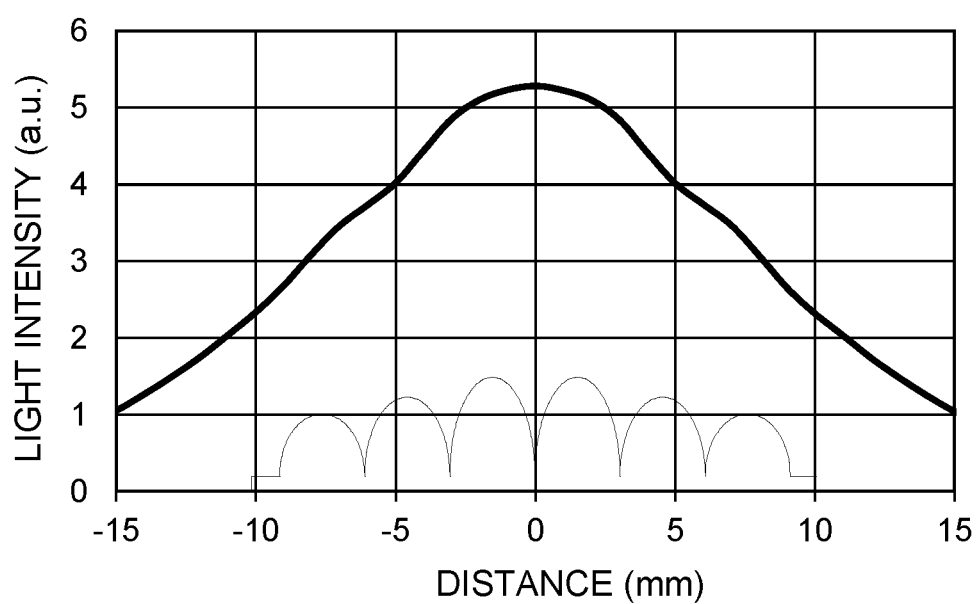
FIG. 3B shows a light intensity distribution curve of the light emitting device in accordance with the schematic cross-sectional view shown in FIG. 3A.
Figure 4:
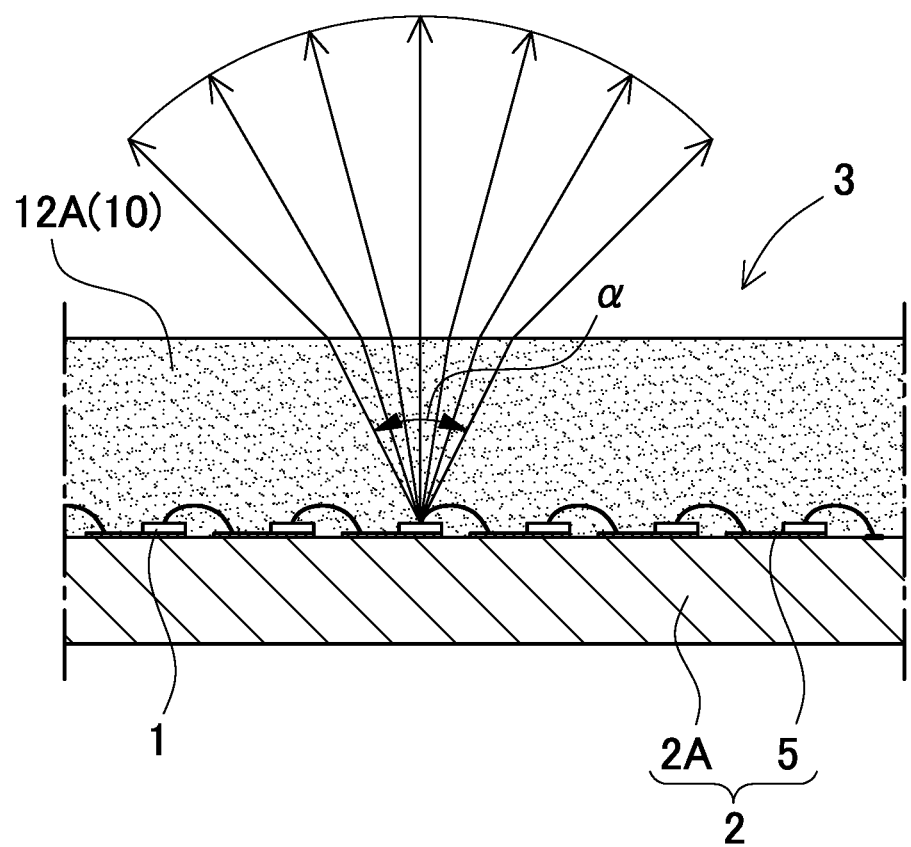
FIG. 4 is a schematic cross-sectional view of the light emitting device shown in FIG. 3A taken along the line IV-IV.
Figure 5:
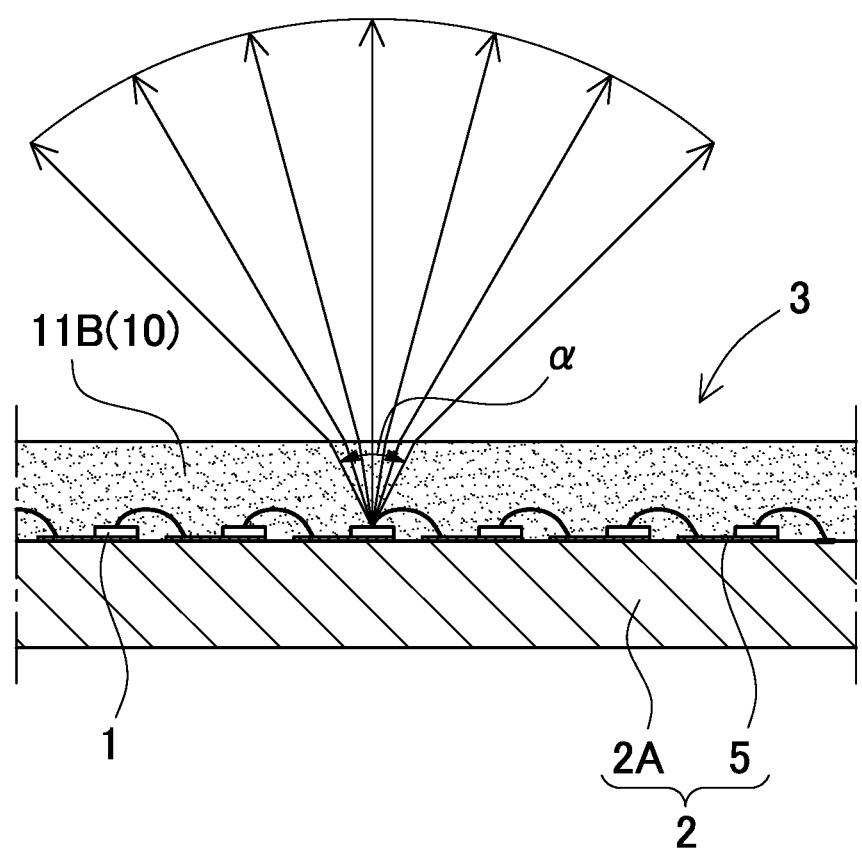
FIG. 5 is a schematic cross-sectional view of the light emitting device shown in FIG. 3A taken along the line V-V.

A light emitting device 100 according to a first embodiment is shown in FIG. 1 to FIG. 5. FIG. 1 is a schematic perspective view of the light emitting device 100 according to the first embodiment. FIG. 2 is a schematic plan view showing an arrangement of a plurality of light emitting elements in the light emitting device 100 shown in FIG. 1. FIG. 3A is a schematic cross-sectional view of the light emitting device 100 shown in FIG. 1 taken along the line IIIA-IIIA. FIG. 3B shows a light intensity distribution curve of the light emitting device 100 in accordance with the schematic cross-sectional view shown in FIG. 3A. FIG. 4 is a schematic cross-sectional view of the light emitting device 100 shown in FIG. 3A taken along the line IV-IV. FIG. 5 is a schematic cross-sectional view of the light emitting device 100 shown in FIG. 3A taken along the line V-V.

The light emitting device 100 includes a substrate 2, a plurality of light emitting elements 1 arranged in three or more light emitting element rows 6 on the substrate 2, and a light-transmissive member 3 including three or more cylindrical lenses arranged parallel to each other along the light emitting element rows 6 so that each of the cylindrical lenses is on one of the light emitting element rows 6. As shown in FIG. 2, in the light emitting device 100 according to the first embodiment, six light emitting element rows 6 are arranged with substantially uniform intervals on the substrate 2, and the light-transmissive member 3 having an array of six cylindrical lenses arranged parallel to each other along the light emitting element rows 6 so that each of the cylindrical lenses is on one of the light emitting element rows 6. In the present specification the expression "substantially uniform intervals" includes intervals with a small difference of 2.0 mm or less.

The cylindrical lens portion 10 includes first cylindrical lens portions 11 including cylindrical lens portions at outermost sides of the array, and a second cylindrical lens portion 12 arranged at an inner side of the first cylindrical lens portions 11 and having a height greatest in the cylindrical lens portion 10. In the first embodiment, as shown in FIG. 2 and FIG. 3A, the first cylindrical lens portions 11 includes a total of four cylindrical lenses, that is, first cylindrical lenses 11B at outermost sides of the array and first cylindrical lenses 11A adjacent to the first cylindrical lenses 11B at an inner side of the cylindrical lenses 11B. Further, the second cylindrical lens portion includes two second cylindrical lenses 12A arranged at a central region of the array at an inner side of the first cylindrical lens portion 11 and having the greatest height of cylindrical lens portion 10. With the light-transmissive member 3 having such a shape, an inclination of a light intensity distribution curve with respect to an array direction of the plurality of cylindrical lenses can be gradually changed, compared with, for example, a light emitting device including a light-transmissive member in which a plurality cylindrical lenses is arranged with substantially the uniform height. The light-transmissive member 3 of the light emitting device 100 is described in detail below.

Light-Transmissive Member 3

The light-transmissive member 3 seals the plurality of light emitting elements 1 arranged on the substrate 2, and serves to protect the light emitting elements 1 from dust and stress from outside and to adjust light distribution so that the light emitting device has a desired light distribution characteristics. As shown in FIG. 3A, in the light-transmissive member 3 according to the first embodiment, three or more cylindrical lenses are connected via a connecting portion 13 at a lower end side (i.e., substrate side) thereof, and adjacent cylindrical lenses define a valley 7. With the array of the plurality of cylindrical lenses integrally disposed by the connecting portion 13 connecting the plurality of cylindrical lenses, the light intensity distribution curve of the light emitting device 100 can be a relatively smooth curve, compared with the case where the plurality of cylindrical lens portions 10 are arranged to be spaced from one another.

In the present specification, the expression "central region of the array of the plurality of the cylindrical lenses of the cylindrical lens portion 10" refers to the valley 7 at the center of array of the plurality of the cylindrical lenses in the case where the cylindrical lens portion 10 includes the cylindrical lenses of an even number of four or greater, and refers to a cylindrical lens at the center of the array of the plurality of the cylindrical lenses in the case where the cylindrical lens portion 10 includes the cylindrical lenses of an odd number of three or greater. The light-transmissive member 3 may further include a flange portion that extends outward from a lower end portion of the cylindrical lens portion 10.

Cylindrical Lens Portion 10

In the present specification, the cylindrical lens portion 10 includes the plurality of cylindrical lenses, and each of the plurality of cylindrical lenses is a flat-convex type lens having an upper surface of a cylindrical surface and a lower surface of a flat surface. In the first embodiment, as shown in FIG. 3A, each of the plurality of cylindrical lenses of the cylindrical lens portion 10 has a cross-sectional shape of a substantially semi-elliptic shape or a substantially semicircular shape protruded at the center thereof. In a plan view, the plurality of cylindrical lenses is arranged in a direction substantially perpendicular to an extending direction of the plurality of cylindrical lenses (the direction of this arrangement may be referred to as an "array direction of the cylindrical lens portion 10".). In the first embodiment, the plurality of cylindrical lenses of the cylindrical lens portion 10 is assumed to have substantially the same diameter.

The light-transmissive member 3 is disposed on the substrate 2 such that each of the cylindrical lenses of the cylindrical lens portion 10 is arranged on one of the light emitting element rows 6, in each of which the plurality of light emitting elements 1 is arranged. On the substrate 2, three or more light emitting element rows 6 are arranged, and accordingly three or more cylindrical lenses are arranged. In the first embodiment, the cylindrical lenses of the cylindrical lens portion 10 are arranged such that a top portion of each of the cylindrical lenses is located above substantially the center of a light emitting surface of each of the plurality of light emitting elements 1.

The light-transmissive member 3 in the first embodiment includes cylindrical lenses having different heights, that is, the first cylindrical lens portions 11 and the second cylindrical lens portion 12, for transmitting light emitted from the plurality of light emitting elements 1 to obtain desired light distribution. The first cylindrical lens portions 11 includes at least cylindrical lenses at outermost sides of the cylindrical lens portion 10. As shown in FIG. 3A, the second cylindrical lens portion 12 is arranged at the inner side of the first cylindrical lens portions 11, and have a height (h1) that is greater than heights (h2, h3) of the first cylindrical lens portion 11 and is greatest of the cylindrical lens portion 10.

It is known that, generally, the greater a height (h) of a cylindrical lens is, the higher directivity of light emitted from a light emitting element. A mechanism of a cylindrical lens portion 10 with a greater height has a directivity greater than a directivity of a cylindrical lens with a smaller height will be illustrated below.

In the first embodiment, as shown in FIG. 3A, the cylindrical lens portion 10 has a plurality of cylindrical lenses having substantially semicircular cross-sectional shapes of substantially the same diameter b (b1, b2, b3 in FIG. 3A) at the lower surfaces. The heights a (a1, a2, a3 in FIG. 3A) of the cylindrical lenses of the cylindrical portion 10 are increased toward the center, so that the second cylindrical lens portion 12 has a greater height than the first cylindrical lens portions 11. With this arrangement, a curved portion at an upper-end side of each of the second cylindrical lenses of the second cylindrical lens portion 12 has a curvature radius smaller than a curvature radius of a curved portion at an upper-end side of each of the first cylindrical lenses of the first cylindrical lens portions 11, so that the second cylindrical lens portion 12 have greater condensing effect than the first cylindrical lens portions 11. Further, increase in height (h) of the cylindrical lenses allows for increase in the condensing effect in the extending direction of the cylindrical lenses (that is the extending direction of the cylindrical lens portion 10). In FIG. 4 and FIG. 5, propagation of light emitted from the light emitting element 1 at an irradiation angle of a in the extending direction of the cylindrical lens portion 10 is schematically illustrated by arrows. As shown in FIG. 4 and FIG. 5, dispersion of light shown in FIG. 5 passing through the first cylindrical lens 11B having a smaller height is greater than that of light shown in FIG. 4 passing through the second cylindrical lens 12A having a greater height, because the passage of light to the interface of the lens is smaller through the first cylindrical lens 11B. Accordingly, the greater the height (h) of the cylindrical lens is, the smaller the dispersion of light in the extending direction of the cylindrical lens may be obtained.

As described above, light condensing effect due to decrease in curvature radius of the upper end side of the cylindrical lens and effect of reducing light diffusion due to increase in height of the cylindrical lens allows directivity of the second cylindrical lens portion 12 to be higher than directivity of the first cylindrical lens portions 11.

The second cylindrical lens portions 12 are preferably arranged at a center region of the array direction of the cylindrical lens portion 10 (that is, the array direction of the plurality of cylindrical lens portions). In the present specification, when a total length of the cylindrical lens portion 10 in the array direction is assumed to be 100, and one end of the cylindrical lens portion 10 in the array direction is assumed to correspond to 0 while the other end thereof is assumed to correspond to 100, the expression "center region" refers to a region corresponding to 20 to 80, more preferably a region corresponding to 40 to 60. More specifically, in the case where the cylindrical lens portion 10 has an array of three cylindrical lenses, the "central region" of the cylindrical lens portion 10 refers to the cylindrical lens at the center of the array. In the case where the cylindrical lens portion 10 has an array of cylindrical lenses of an odd number of five or more, the "central region" of the cylindrical lens portion 10 includes a cylindrical lens at the center of the array or at least one cylindrical lens at at least one side at both sides of the cylindrical lens at the center. More specifically, in the case where cylindrical lens portion 10 has an array of four cylindrical lenses, the "central region" of the cylindrical lens portion 10 refers to two cylindrical lenses defining the valley at the center of the array. In the case where the cylindrical lens portion 10 has an array of cylindrical lenses of an even number of six or more, the "central region" of the cylindrical lens portion 10 includes at least one cylindrical lens of cylindrical lenses defining the valley at the center of the array and at least one cylindrical lens at both sides of cylindrical lenses defining the valley. With the second cylindrical lens portion 12 having high directivity as described above arranged in such a region, the light emitting device 100 having a high intensity in a center region of the light intensity distribution curve can be obtained.

In the first embodiment, as shown in FIG. 3A, the light-transmissive member 3 includes a cylindrical lens portion 10 having six cylindrical lenses. Of the six cylindrical lenses, a total of four cylindrical lenses, that is, two outermost cylindrical lenses and their adjacent cylindrical lenses, are referred to as the first cylindrical lens portions 11, and the other two cylindrical lenses at the inner side of the first cylindrical lens portions 11, that is, cylindrical lenses defining the valley 7 in the center of the plurality of cylindrical lenses, are referred to as the second cylindrical lens portion 12, which has the greatest height of the plurality of the cylindrical lenses of the cylindrical portion 10.

In the light-transmissive member 3 shown in FIG. 3A, the second cylindrical lenses 12A has the greatest height (h1), and the first cylindrical lenses 11B at both ends of the array has the smallest height (h3). Further, the first cylindrical lens portions 11 have heights gradually decreased from a second cylindrical lens portion 12 toward an outermost cylindrical lens. The first cylindrical lens portions 11 and the second cylindrical lens portion 12 can have any appropriate heights in accordance with the size and arrangement of the light emitting elements 1. Each of the first cylindrical lenses of the first cylindrical lens portions 11 and each of the second cylindrical lenses of the second cylindrical lens portion 12 can have a height in a range of, for example, 0.1 mm to 4.0 mm. Further, in the first embodiment, heights of the cylindrical lens portion 10 can be decreased by 0.1 mm for each from the second cylindrical lens portion 12 toward the outer side. More specifically, the first cylindrical lenses 11A can have a height smaller than a height of the second cylindrical lenses 12A by 0.1 mm, and the first cylindrical lenses 11B can have a height smaller than the height of the first cylindrical lenses 11A by 0.1 mm. With this arrangement, as shown in FIG. 3B, the light emitting device 100 can be obtained having light intensity distribution curve in which inclination is gradually changed and light intensity is increased at the center portions of the light intensity distribution curve, compared with light intensity distribution curve of a light emitting device comprising a light-transmissive member having an array of a plurality of cylindrical lenses with substantially uniform height is arranged. In the graph shown in FIG. 3B, light intensity distribution curve of the light emitting device including the light emitting element 1 of 1.4 mm by 1.4 mm in a plan view with a thickness of 0.3 mm, and the light-transmissive member 3 with a diameter of each of the cylindrical lenses of the cylindrical lens portion 10 (b1, b2, b3) of 3.0 mm, a height of the second cylindrical lenses 12A (h1) of 3.5 mm, a height of the first cylindrical lenses 11A (h2) of 2.8 mm, and a height of the first cylindrical lenses 11B (h3) of 2.5 mm is shown.

Further, heights of the plurality of cylindrical lenses of the cylindrical lens portion 10 shown in FIG. 3A are symmetrical with respect to the center of the array of the plurality of cylindrical lenses (in the first embodiment, the valley 7 at the center of the array). More specifically, the two second cylindrical lenses 12A arranged adjacent to each other at the central region of the array have substantially the same height (h1), the two first cylindrical lenses 11A respectively at a left side and a right side of the second cylindrical lenses 12A have substantially the same height (h2), and the two first cylindrical lenses 11B adjacent to the first cylindrical lenses 11A, that is, the cylindrical lenses at the outermost sides of the array, have substantially the same height (h3). In this manner, with the plurality of cylindrical lenses of the cylindrical lens portion 10 having heights symmetrical with respect to the center of the array of the plurality of cylindrical lenses, the light intensity distribution curve of the light emitting device 100 in the array direction of the cylindrical lens portion 10 (i.e., the array direction of the plurality of cylindrical lens portions) can be symmetrical. The plurality of cylindrical lenses of the cylindrical lens portions 10 may have heights that are non-symmetrical with respect to the center of the array of the plurality of cylindrical lenses to realize a desired light distribution.

Examples of a material for the light-transmissive member 3 include a resin such as a thermosetting resin or a thermoplastic resin, and glass. For a resin, for example, silicone resin can be used in view of durability, ease of molding, and the like. The light-transmissive member 3 can be formed by compression molding, transfer molding, casting-molding, or the like. More specifically, for example, the light-transmissive member 3 can be formed such that an upper surface of the substrate 2 having the plurality of light emitting elements 1 arranged thereon is enclosed by a mold having a recess corresponding to the shape of the cylindrical lens portion 10 having a plurality of cylindrical lenses, and a liquid material is injected into a space defined by the substrate and the mold, and then, hardened. Alternatively, the light-transmissive member 3 may be formed by disposing a material such as a resin of an appropriate viscosity or the like, in a line-like shape on each of the light emitting element rows and then hardened.

Occurrence of voids or the like in the light-transmissive member can be reduced by adjusting irregularities on a surface of the substrate 2, viscosity of a resin at the time of injection, temperature, injecting pressure, etc. With sufficient intervals between the plurality of light emitting elements 1 on the substrate 2, flowability of the light-transmissive member 3 injected in to the space can be increased, so that occurrence of voids can be decreased. Further, in a step before injection of the light-transmissive member 3, a surface of the substrate 2 on which the light emitting elements are mounted may be wet by an organic solvent or the like, which allows for improving flowability of the light-transmissive member 3 at the time of molding. For such an organic solvent, for example, metyletylketon (MEK) may be used.

Light Emitting Element 1

For each of the light emitting elements 1, a semiconductor light emitting element such as a light emitting diode element is preferably used. For such a semiconductor light emitting element, a semiconductor light emitting element made of one or more nitride semiconductors and the like is preferably used. Each of the light emitting elements 1 includes semiconductor layers including a light emitting layer, and positive and negative electrodes. Examples of the material of the light emitting layer include $In_XAl_YGa_{1-X-Y}N$ ($0 \leq X \leq 1$, $0 \leq Y \leq 1$, $X+Y \leq 1$). In the present embodiment, for the light emitting elements 1, light emitting elements configured to emit any appropriate wavelength in a range of ultraviolet light to infrared light can be selected, and in particular, light emitting elements configured to emit ultraviolet light can be selected. In the present specification, the term "ultraviolet light" refers to light with a wavelength of 400 nm or less. In particular, light emitting elements configured to emit light with a wavelength of 330 nm to 380 nm, which is a so-called near-ultraviolet region, can be preferably used for the light emitting elements 1.

Each of the light emitting elements 1 in the first embodiment has an upper surface and a lower surface, and includes an upper surface electrode and a lower surface electrode at the upper surface and the lower surface, respectively. The lower surface electrode is bonded with respective one of conductive layers 5 on the substrate 2 via a conductive adhesive agent or the like. For the conductive adhesive agent, for example, a solder such as Au—Sn or Au—In can be used. Further, via a conductive wire 4, the upper surface electrode of each of the light emitting elements 1 is electrically connected with a conductive layer 5 adjacent to the conductive layer 5 that is connected with the lower surface electrode. In each of the light emitting elements 1 shown in FIG. 2, the electrode is disposed on a center region of the upper surface, and the electrode is connected with the conductive layer 5 via one conductive wire 4. The position of the electrode and the number of the electrode and the conductive wires may be changed as appropriate. Alternatively, in each of the light emitting elements 1, positive and negative electrodes may be disposed on the same surface, a surface at which an electrode is disposed may be bonded with the conductive later 5, or a surface opposite to a surface at which an electrode is disposed may be connected to the conductive layer 5 via an insulating adhesive agent while each electrode is electrically connected with corresponding one of the conductive layers 5 via each of the conductive wires.

The light emitting elements 2 shown in FIG. 2 each has a planar shape of a substantially quadrangular shape. Examples of a quadrangular shape include a square shape and a rectangular shape. For the planar shape of each of the light emitting elements 1, any other appropriate shape may be employed, and for example, a polygonal shape such as a hexagonal shape, a circular shape, an elliptical shape, or the like may be employed. The light emitting elements 1 can each have appropriate size and thickness. For example, light emitting elements 1 each having dimensions of 1.4 mm by 1.4 mm in a plan view and a thickness of 0.3 mm may be used.

As shown in FIG. 2, the plurality of light emitting elements 1 is arranged in lines to form three or more light emitting element rows 6 such that the plurality of light emitting elements 1 is arranged in a matrix. In FIG. 2, six light emitting element rows 6 are arranged, in each of which twelve light emitting elements 1 are arranged. Accordingly, the light emitting device 100A includes seventy-two light emitting elements 1. An arrangement pattern of the light emitting elements 1, the number of the light emitting elements 1, and the number of the light emitting element rows 6 is not limited to this, and may be changed as appropriate. Further, in the first embodiment, the light emitting elements 1 in each of the light emitting element rows 6 are arranged at substantially uniform intervals, and the light emitting element rows 6 are arranged at substantially uniform intervals. Such an arrangement of the light emitting elements 1 and the light emitting element rows 6 with substantially the uniform intervals allows for facilitating mounting of the light emitting elements 1, and thus is preferable.

The plurality of light emitting elements 1 in FIG. 2 is connected twelve in series and six in parallel via the conductive layers 5 and conductive wires 4. Connecting pattern of the light emitting elements 1 is not limited to this, and can be changed as appropriate. Further, in the first embodiment, an arrangement direction of the plurality of light emitting elements 1 connected in series corresponds to the extending direction of the cylindrical lens portion 10. With this arrangement, the valleys 7, at which the light-transmissive member 3 has a relatively small thickness, can be easily formed so as not to overlap with connecting portions between the conductive wires 4, which is connected with the light emitting elements 1, and the conductive layers 5. With this arrangement, stress from the outside is not easily applied to the connecting portion, so that occurrence of disconnection of the conductive wires 4 can be reduced.

Substrate 2

As shown in FIG. 2 and FIG. 3A, the substrate 2 includes an insulating base member 2A, and the conductive layers 5 arranged on the base member 2A for supplying electricity to the light emitting elements 1. The substrate 2 may have, as shown in FIG. 1, holes 18 for fixing the light emitting device 100 to a mounting substrate using a fixing member 19 at both end portion sides in the extending direction of the substrate 2.

Examples of a material for the base member 2A include an insulating member such as ceramics, a resin, and glass. In particular, in view of heat dissipation performance, ceramics, which is an inorganic material, is preferably employed. For ceramics, in particular, ALN, which has high heat dissipation performance, is preferably used.

For a material of the conductive layers 5, any appropriate material that can be electrically connected with the light emitting elements 1 can be used, and a material known in this field can be used. For example, Cu, Ni, Pd, W, Cr, Ti, Al, Ag, Au, or alloy of two or more of these metals can be used for the conductive layers 5. In particular, copper or a copper alloy is preferable in view of heat dissipation performance. On a surface of the conductive layer 5, a film made of Ag, Pt, Sn, Au, Cu, Rd, or an alloy of two or more of those metals, or an oxide of one or more of those metals may be formed. The conductive layers 5 may be formed by plating, sputtering, or another known method. Alternatively, a lead frame may be used, and the base member such as a resin may be molded with the lead frame to serve as the substrate 2.

Conductive Wire 4

In the first embodiment, via a conductive wire 4, the upper surface electrode of each of the light emitting elements 1 is electrically connected with a conductive layer 5 adjacent to the conductive layer 5 on which the light emitting element 1 is mounted. The conductive wires 4 are metal wires, and each connected so as to form a predetermined curved shape. Examples of a material of the conductive wires 4 include Au.

The light emitting device 100 may further include an electrical component such as a protective element. For the protective element, for example, a Zener diode, a capacitor, or a varistor can be used. In particular, with a Zener diode that serve as the protective element, the light emitting device 100 with high reliability in operation can be provided.

Second Embodiment

Figure 6:
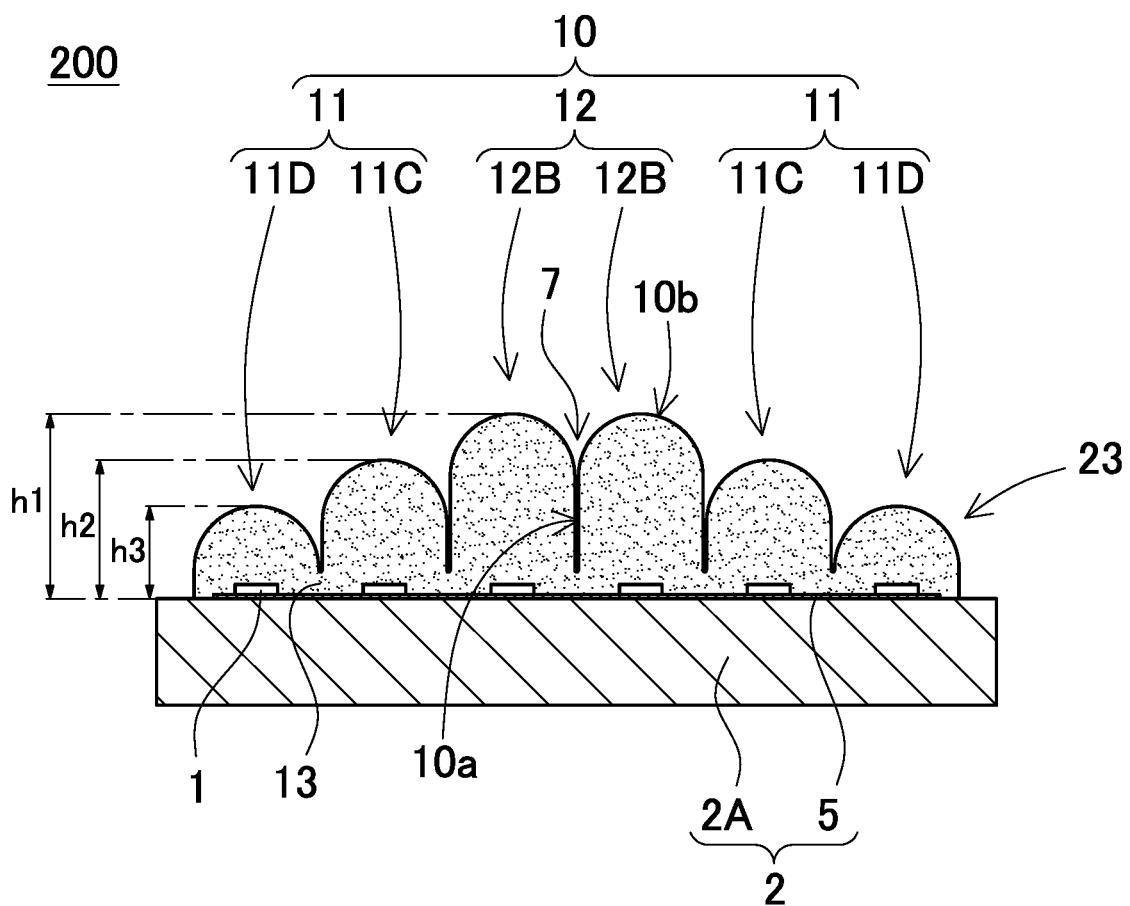
FIG. 6 is a schematic cross-sectional view of a light emitting device according to a second embodiment.

FIG. 6 is a schematic cross-sectional view of a light emitting device 200 according to a second embodiment. In the light emitting device 200 according to the second embodiment, a light-transmissive member 23 has a shape different from a shape of the light-transmissive member 3 in the first embodiment shown in FIG. 3A. The light-transmissive member 23 shown in FIG. 6 has a shape in which six cylindrical lenses of the cylindrical lens portion 10 are connected by the connecting portion 13, and two cylindrical lenses arranged at a center region are second cylindrical lenses 12B (second cylindrical lens portion 12) having the greatest height of the cylindrical lens portion 10. A total of four first cylindrical lenses, two first cylindrical lenses 11O and 11D at the left side, and the other two first cylindrical lenses 11C and 11D at the right side, are arranged at the right and left sides (i.e., outer sides), respectively, of the second cylindrical lenses 12B, 12B (second cylindrical lens portion 12) that are adjacent to each other. In the light-transmissive member 23 shown in FIG. 6, the two first cylindrical lenses 11D, which are outermost cylindrical lenses of the cylindrical lens portion 10, have the smallest height (h3), and heights of the cylindrical lenses of the cylindrical lens portion 10 are gradually decreased outward from a second cylindrical lens portion 12. Further, heights of the plurality of cylindrical lenses of the cylindrical lens portion 10 shown in FIG. 6 are symmetrical with respect to the center along the arrangement (array) direction, that is, the center of the array of the cylindrical lenses (in the second embodiment, a valley at the center of the plurality of cylindrical lens portion 10). More specifically, the two second cylindrical lenses 12B in the center portion have substantially the same height (h1), the two first cylindrical lenses 11O, which are at both sides of the second cylindrical lenses 12B, have substantially the same height (h2), and the two first cylindrical lenses 11D at the outer side of the first cylindrical lenses 11O, that is, the outermost cylindrical lenses of the cylindrical lens portion 10, have substantially the same height (h3).

Each of the plurality of the cylindrical lenses of the cylindrical lens portion 10 shown in FIG. 6 has a curved portion 10b at an upper end side thereof, and the curved portions 10b of the plurality of the cylindrical lenses have substantially the same curvature radius. Meanwhile, each of the plurality of the cylindrical lenses has a pillar-like portion 10a at a lower end side thereof, and heights of the pillar-like portions 10a of the plurality of the cylindrical lenses are varied, so that the heights of the first cylindrical lens portions 11 are different from a height of the second cylindrical lens portion 12. That is, in the light-transmissive member 23 shown in FIG. 6, a height of the pillar-like portions 10a of the second cylindrical lenses 12B are increased, so that the curved portions 10b are located higher than the pillar-like portions 10b of the first cylindrical lens portions 11.

In the cylindrical portion 10 having a plurality of cylindrical lenses in the second embodiment, the curved portions 10b have substantially the same curvature radius, so that the curved portions 10b are not greatly different from each other in directivity. Meanwhile, with the pillar-like portions 10a of the second cylindrical lenses 12B having heights greater than a height of the pillar-like portions 10b of the first cylindrical lenses 11C, 11D, light from the light emitting elements 1 can be efficiently reflected toward the curved portions 10b, and the second cylindrical lens 12B can have directivity higher than the directivity of the first cylindrical lenses 11C, 11D.

Further, as in the description above, with the second cylindrical lenses 12B having a height greater than heights of the first cylindrical lenses 11C, 11D, diffusion of light can be reduced, which allows directivity of the second cylindrical lenses 12B to be higher than directivity of the first cylindrical lenses 11C, 11D.

In the light-transmissive member 23 shown in FIG. 6, valley 7 between adjacent cylindrical lenses of the cylindrical lens portion 10 have a depth greater than that of the valley 7 between the cylindrical lenses of the cylindrical portion 10 in the first embodiment shown in FIG. 3A. With this arrangement, pillar-like portions 10a of the cylindrical lenses can be provided, which allows for increasing directivity of the second cylindrical lens portion 12. Meanwhile, in the light-transmissive member 23 shown in FIG. 6, the pillar-like portions 10a of adjacent cylindrical lens portions may be arranged to be in contact with each other. As described above, with the light-transmissive member 23 in which heights of the first cylindrical lens portions 11 are gradually decreased from the second cylindrical lens portion 12 side toward the outer side, an inclination of light intensity distribution curve of the light emitting device 200 with respect to an array direction of the cylindrical lenses of the cylindrical lens portion 10 can be gradually changed.

Third Embodiment

Figure 7:
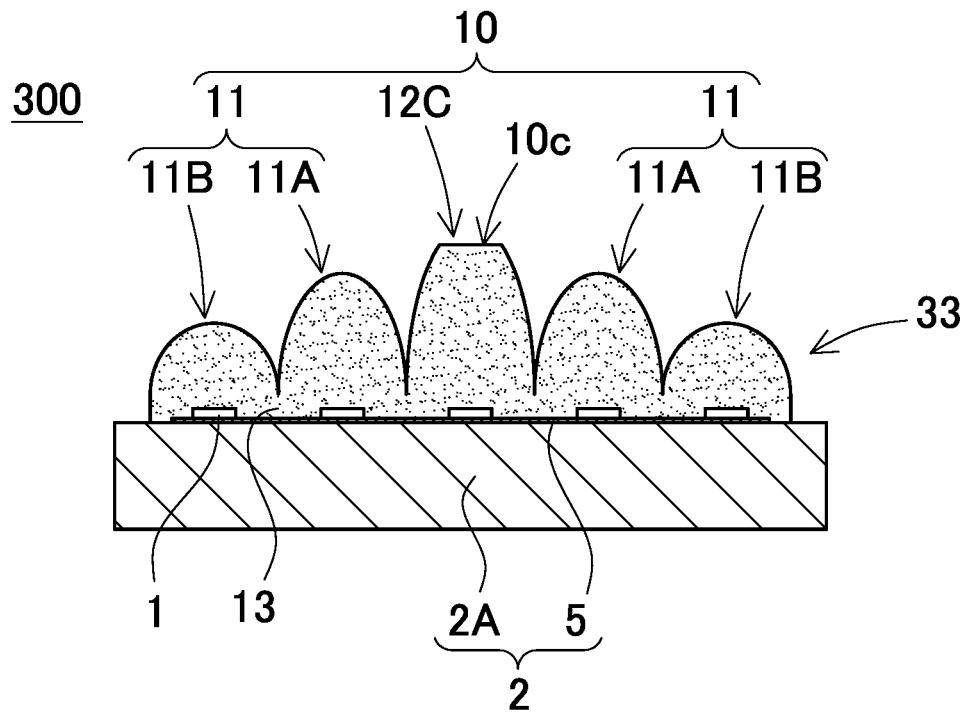
FIG. 7 is a schematic cross-sectional view of a light emitting device according to a third embodiment.

FIG. 7 is a schematic cross-sectional view of a light emitting device 300 according to a third embodiment. In the light emitting device 300 according to the third embodiment, a light-transmissive member 33 has a shape different from both of a shape of the light-transmissive member in the first embodiment and the light-transmissive member in the second embodiment. More specifically, the light-transmissive member 33 of the light emitting device 300 according to the third embodiment includes a cylindrical lens portion 10 having an odd number of five cylindrical lenses, in which the five cylindrical lenses are connected via a connecting portion 13. Further, of the five cylindrical lenses, a second cylindrical lens 12C is arranged at the center of the cylindrical lens portion 10, and a total of four first cylindrical lenses, two first cylindrical lens 11A and 11B at the left side, and the other two first cylindrical lens 11A and 11B at the right side, are arranged at the right and left sides of the second cylindrical lens 12C. In the light-transmissive member 33 shown in FIG. 7, the two first cylindrical lenses 11B, which are outermost cylindrical lenses of the cylindrical lens portion 10 having five cylindrical lenses, have the smallest height, and heights of the cylindrical lenses are gradually decreased outward from a second cylindrical lens 12C. Further, heights of the five cylindrical lenses of the cylindrical lens portion 10 shown in FIG. 7 are symmetrical with respect to the second cylindrical lenses 12C at the center one of the cylindrical lens portion 10. That is, the two second cylindrical lenses 11A respectively adjacent to the second cylindrical lens 12C have substantially the same height, and the two first cylindrical lenses 11B respectively at an outer side of the first cylindrical lenses 11A, that is, the outermost cylindrical lenses of the cylindrical lens portion 10, have substantially the same height.

Further, each of the second cylindrical lens 12C in the third embodiment has a flat portion 10c at an upper end side thereof. Alternatively, the first cylindrical lenses 11A and/or 11B of the first cylindrical lens portion 11 may have flat portions at an upper end side thereof, respectively, or both of the first cylindrical lens portions 11 and the second cylindrical lens portion 12C may have flat portions at an upper end side thereof, respectively. As described above, with the light-transmissive member 33 in which heights of the first cylindrical lens portions 11 are gradually decreased from the second cylindrical lens portion 12 side toward the outer sides, an inclination of light intensity distribution curve of the light emitting device 300 with respect to an array direction of the cylindrical lens portion 10 can be gradually changed. Further, with the light-transmissive member 33 having the one or more flat portions in the cylindrical lens portion 10, light can be dispersed at the one or more flat portions, so that inclination in light intensity distribution curve of the light emitting device can be changed more gradually.

Fourth Embodiment

Figure 8:
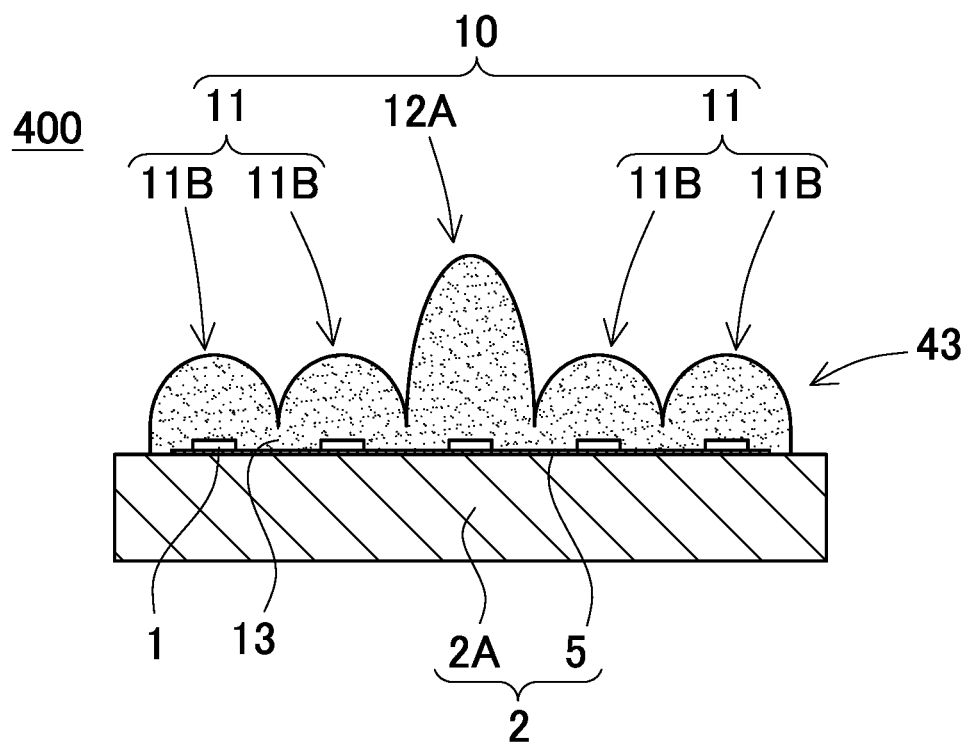
FIG. 8 is a schematic cross-sectional view of a light emitting device according to a fourth embodiment.

FIG. 8 is a schematic cross-sectional view of a light emitting device 400 according to a fourth embodiment. As in the third embodiment, a light-transmissive member 43 in the fourth embodiment includes a cylindrical lens portion 10 having five cylindrical lens portion 10. In the fourth embodiment, each of the five cylindrical lenses has a curved surface at an upper end side thereof. A second cylindrical lens 12A at the center of the array of the five cylindrical lenses has the greatest height of the cylindrical lens portion 10. First cylindrical lenses 11B, 11B on both sides of the second cylindrical lens 12A, and first cylindrical lenses 11B, 11B on outer sides thereof have substantially uniform height that is smaller than the height of the second cylindrical lens 12A. With the light-transmissive member 43 as described above, inclination in the light intensity distribution curve of the light emitting device 400 in an arrangement direction of the cylindrical lens portion 10 can be gradually changed, and light intensity distribution curve of the light emitting device 400 in an arrangement direction of the cylindrical lens portion 10 can be a sharp curve.

Fifth Embodiment

Figure 9:
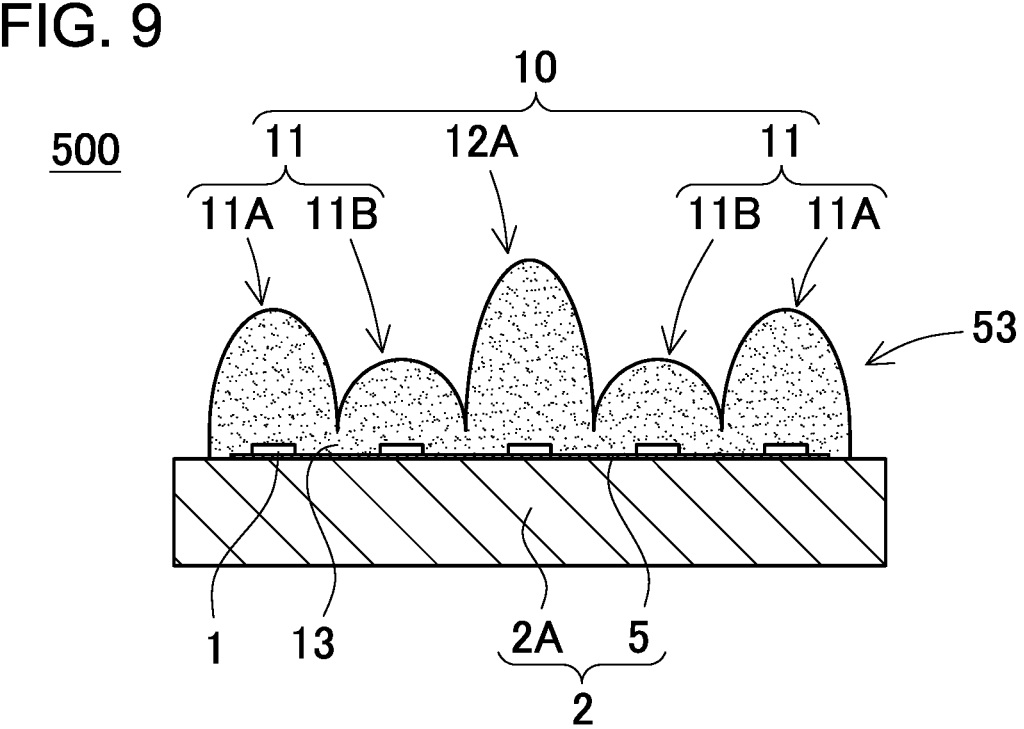
FIG. 9 is a schematic cross-sectional view of a light emitting device according to a fifth embodiment.

FIG. 9 is a schematic cross-sectional view of a light emitting device 500 according to a fifth embodiment. A light-transmissive member 53 in the light emitting device 500 according to the fifth embodiment includes a cylindrical lens portion 10 having five cylindrical lenses. Each of the five cylindrical lenses has a curved surface at an upper end side thereof. A second cylindrical lens 12A, which is the center one of the five cylindrical lenses, has the greatest height of the five cylindrical lenses. In the fifth embodiment, a total of four first cylindrical lenses, two first cylindrical lenses 11A and 11B at the left side, and the other two first cylindrical lenses 11A and 11B at the right side, are arranged at the right and left sides, (i.e., outer sides) of the second cylindrical lens 12A. In the fifth embodiment, the first cylindrical lenses 11A, which are outermost cylindrical lenses of the five cylindrical lense, have a height greater than a height of the first cylindrical lenses 11B at an inner side of the first cylindrical lens 11A. Further, heights of the five cylindrical lenses shown in FIG. 9 are symmetrical with respect to the second cylindrical lens 12A, which is the center one of the cylindrical lens portion 10. That is, the two second cylindrical lenses 11B adjacent to the second cylindrical lens 12A have substantially the same height, and the first cylindrical lenses 11B at an outer side of the first cylindrical lenses 11A, that is, the outermost cylindrical lenses of the cylindrical lens portion 10, have substantially the same height. As described above, with the light-transmissive member 53 including the first cylindrical lens portions 11 that has a height smaller than a height of the second cylindrical lens portion 12 at an outer side of the second cylindrical lens portion 12, an inclination of a light intensity distribution curve of the light emitting device 500 with respect to an arrangement direction of the cylindrical lens portion 10 can be gradually changed. Further, with the first cylindrical lenses 11B having the smallest heights arranged between the second cylindrical lens portion 12 and the first cylindrical lenses 11A respectively, dents can be created in the light intensity distribution curve of the light emitting device 500.

Sixth Embodiment

Figure 10:
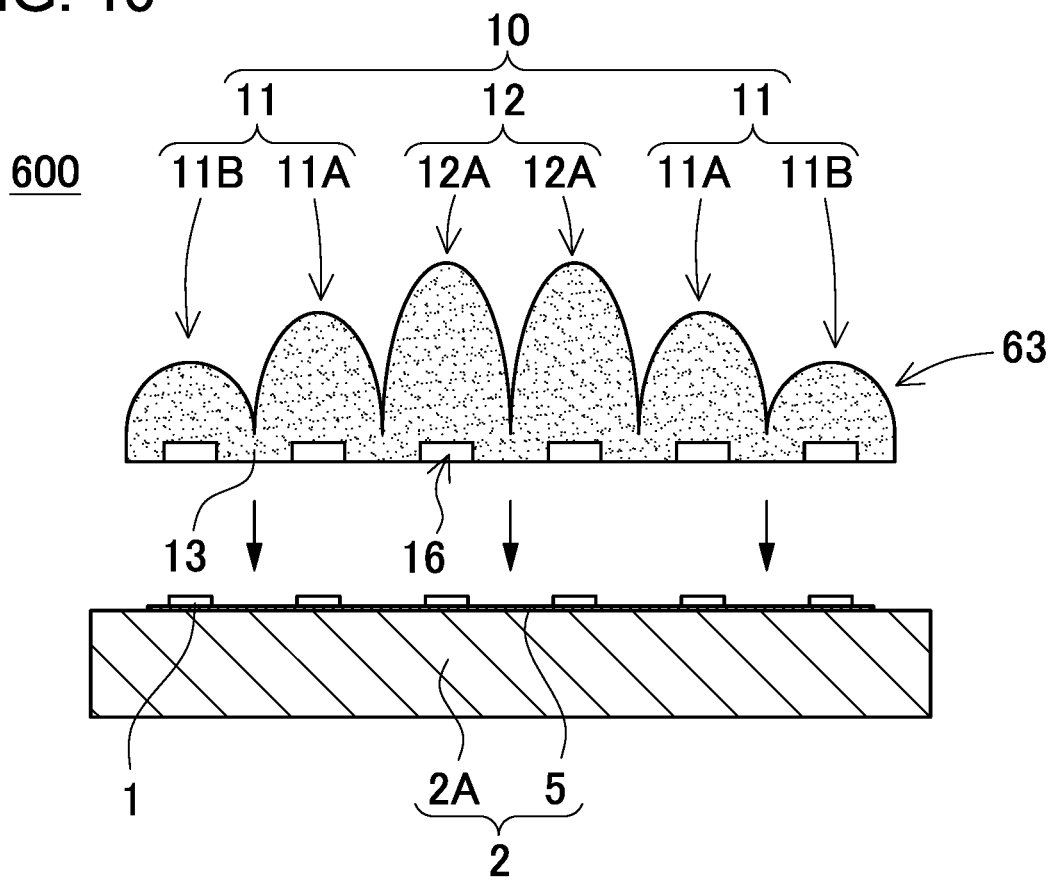
FIG. 10 is a schematic cross-sectional view of a light emitting device according to a sixth embodiment.

FIG. 10 is a schematic cross-sectional view of a light emitting device 600 according to a sixth embodiment. In each of the first embodiment to the fifth embodiment, the light-transmissive member directly covers the light emitting elements 1 arranged on the substrate 2, but any other appropriate configurations may be employed, for example, a space may be defined between the light-transmissive member and the light emitting elements 1. The light-transmissive member directly covering the light emitting elements 1 can be formed by molding using a mold, but in the sixth embodiment, as shown in FIG. 10, a light-transmissive member 63 having recesses 16 configured to house each of the light emitting elements 1 is provided, and is placed on a substrate 2 such that the light emitting elements 1 on the substrate 2 are respectively stored in corresponding one of the recesses 16. With the light-transmissive member 63 having such a structure, the light-transmissive member 63 can be spaced from the light emitting elements 1, so that degradation of the light-transmissive member 63 due to light and-or heat from the light emitting elements 1 can be reduced. Further, placing the light-transmissive member 63 that has been provided on the substrate can reduce influence of heat applied to the substrate 2 and the light emitting elements 1, compared with the case where the light-transmissive member is directly molded on the substrate 2 on which the light emitting elements 1 are mounted. The light-transmissive member 63 that has been formed into a predetermined shape can be fixed on the substrate 2 by bonding or the like.

Seventh Embodiment

Figure 11:
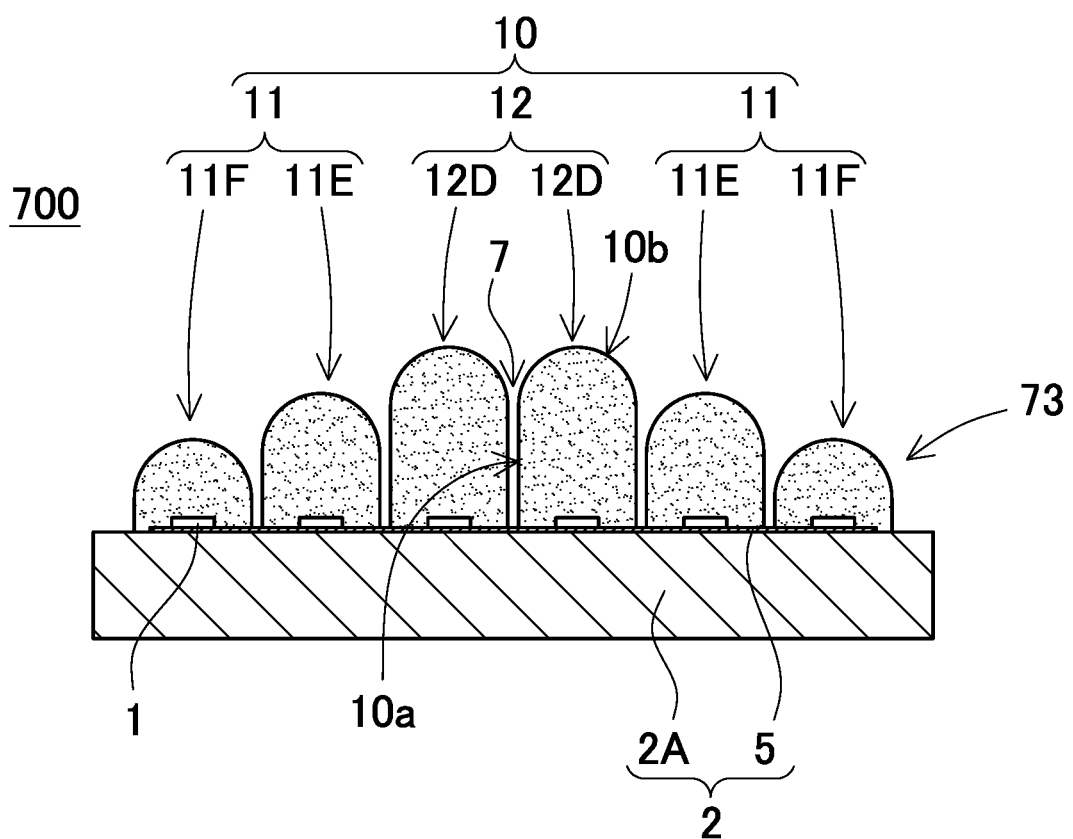
FIG. 11 is a schematic cross-sectional view of a light emitting device according to a seventh embodiment.

FIG. 11 is a schematic cross-sectional view of a light emitting device 700 according to a seventh embodiment. As shown in FIG. 11, in a light-transmissive member 73 of the light emitting device 700 according to the seventh embodiment, a plurality of cylindrical lenses of the cylindrical lens portion 10 is arranged to be spaced from one another, and does not include a connecting portion. More specifically, each of the cylindrical lenses in the seventh embodiment includes a curved portion 10b at an upper end side thereof, and a pillar-like portion 10a below the curved portion 10b. Further, two cylindrical lenses arranged at a center portion of an array of six cylindrical lenses are second cylindrical lenses 12D (i.e., a second cylindrical lens portion 12) having the greatest height of the plurality of cylindrical lens portions 10. Further, a total of four first cylindrical lenses, two first cylindrical lenses 11E and 11F at the left side, and the other two first cylindrical lenses 11E and 11F at the right side, (i.e., a first cylindrical lens portion 11) are arranged at the right and left sides, (i.e., outer sides) of the second cylindrical lens portion 12, respectively, that are adjacent to each other. In the light-transmissive member 73 shown in FIG. 7, the two first cylindrical lenses 11F at outermost sides of the cylindrical lens portion 10 has the smallest height, and heights of the cylindrical lens portions 10 are gradually decreased from a second cylindrical lens 12D toward an outer side. Further, heights cylindrical lens portion 10 shown in FIG. 3A are symmetrical with respect to a valley 7 at the center of the array of the plurality of cylindrical lenses in the arrangement direction. More specifically, the two second cylindrical lenses 12D adjacent to each other at the center portion have substantially the same height, the two first cylindrical lenses 11E at both sides of the second cylindrical lenses 12D have substantially the same height, and the two first cylindrical lenses 11F at the outer side of the first cylindrical lenses 11E, that is, the cylindrical lenses at the outermost sides of the cylindrical lens portions 10, have substantially the same height.

Also in the seventh embodiment, with the light-transmissive member 73 in which heights of the first cylindrical lens portions 11 are gradually decreased outward from a second cylindrical lens portion 12, an inclination of a light intensity distribution curve of the light emitting device 700 with respect to an array direction of the cylindrical lens portion 10 can be gradually changed. Further, with the plurality of cylindrical lenses arranged spaced from each other, a plurality of dents can be created in the light intensity distribution curve of the light emitting device. FIG. 11 shows the light emitting device 700 having the light-transmissive member 73 in which the plurality of cylindrical lenses of the cylindrical lens portion 10 each having a pillar-like portion 10a are arranged spaced from one another. But each of the plurality of cylindrical lenses arranged spaced from one another may have a cross-sectional shape of a substantially semi-elliptical shape as shown in FIG. 3A (i.e., such as the light-transmissive member 3 shown in FIG. 3A but without the connecting portion 13), for example.

In the first embodiment to the seventh embodiment, the light emitting devices including the light-transmissive member having a cylindrical lens portion 10 that includes six cylindrical lenses, with a second cylindrical lens portion 12 having two second cylindrical lenses defining a valley at the center of the array, or the light emitting devices including the light-transmissive member having a cylindrical lens portion 10 that includes five cylindrical lenses with the second cylindrical lens portion 12 at the center thereof are respectively shown, but the number of the cylindrical lenses of the cylindrical lens portion may be any appropriate number of three or more. Further, in the light-transmissive member having a cylindrical lens portion 10 that includes six cylindrical lenses, a total of four cylindrical lenses, two cylindrical lenses defining the valley at the center and two cylindrical lenses each of which is arranged adjacent to one of the two cylindrical lenses that define the valley may be referred to as the second cylindrical lens portion 12. Furthermore, in the light-transmissive member having a cylindrical lens portion 10 that includes five cylindrical lenses, a total of three cylindrical lenses, one at the center and two adjacent to the center may be referred to as the second cylindrical lens portion 12.

Eighth Embodiment

Figure 12A:
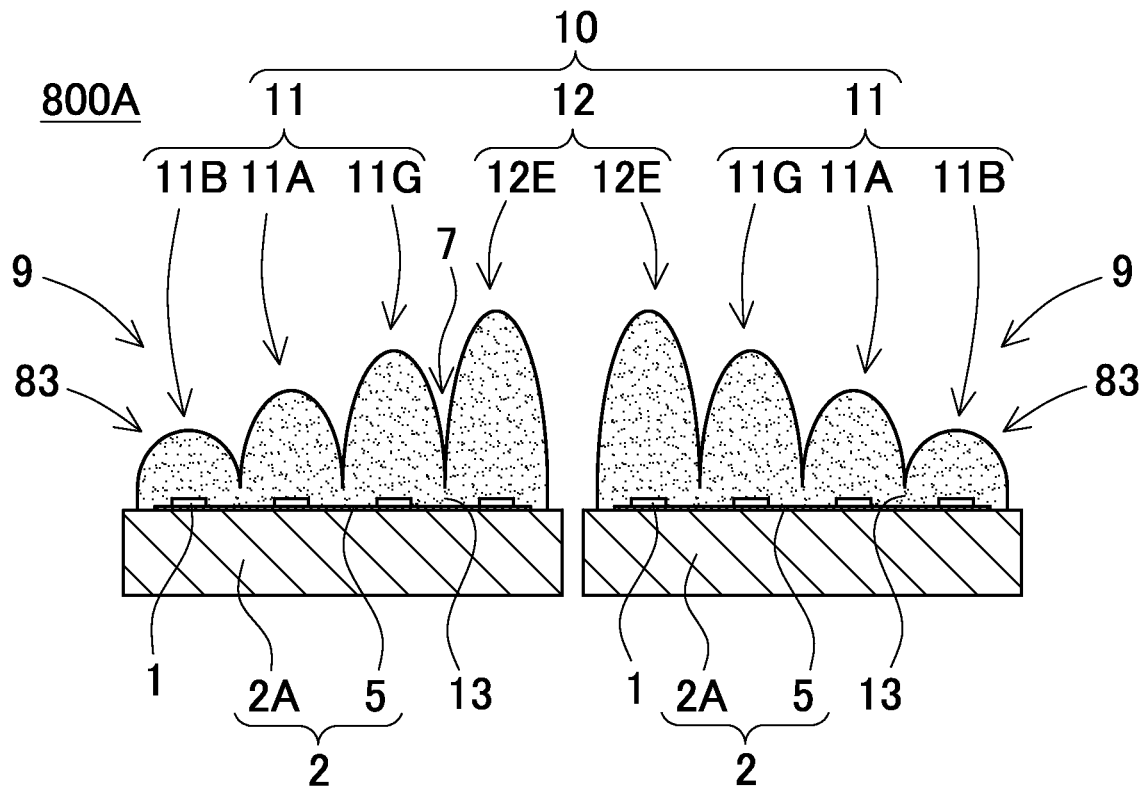
FIG. 12A is a schematic cross-sectional view of a light emitting device according to an eighth embodiment.

FIG. 12A is a schematic cross-sectional view of a light emitting device 800A according to an eighth embodiment. In the eighth embodiment, the light emitting device 800A has light emitting units 9. Each of the light emitting units 9 includes a substrate 2, a plurality of light emitting elements 1 arranged in at least one light emitting element row 6 on the substrate 2, and a light-transmissive member 83 including at least one cylindrical lens arranged parallel to each other along the light emitting element rows 6 so that each of the at least one cylindrical lens is on one of the light emitting element rows 6. The plurality of light emitting element rows 6 of each of the light emitting units 9 in the eighth embodiment are arranged in an arrangement direction of the light emitting units 9.

The light-transmissive member 83 of each of the light emitting units shown in FIG. 12A has an array of four cylindrical lenses in which a cylindrical lens portion at one of the outermost sides of the array has the greatest height, and heights of the cylindrical lens portion 10 is decreased from the cylindrical lens with the greatest height to the other one of the outermost sides of the array. In the light emitting device 800A according to the eighth embodiment, two light emitting units 9 are arranged such that cylindrical lenses 12E having the greatest height and respectively arranged at one outermost side of the array of the cylindrical lenses (i.e., a second cylindrical lens 12E) of each of light emitting units 9 faces each other. Accordingly, the light emitting device 800A having two light emitting units 9 has a total of eight cylindrical lenses, two second cylindrical lenses 12E, 12E each arranged in each of the light emitting units 9 to face each other, six first cylindrical lenses 11G, 11A, 11B, 11G, 11A, 11B (i.e., first cylindrical lens portion 11) at an outer side of the second cylindrical lenses 12E, 12E. In the eighth embodiment, heights of eight cylindrical lenses of the light emitting device 800A are symmetrical with respect to a space between the light emitting units 9.

In this manner, when the plurality of cylindrical lenses of the cylindrical lens portion 10 has heights symmetrical with respect to the center thereof in the array direction, the light intensity distribution curve of the light emitting device 800A in the array direction of the cylindrical lens portion 10 can be symmetrical. In the light emitting device 800A of the eighth embodiment 800A, the light emitting units 9 including the light-transmissive members 83 of the same shape are arranged such that the second cylindrical lenses 12E of two light emitting units 9 face each other, that is, the two second cylindrical lens portions are arranged at the center of the cylindrical lens portion 10, the light emitting device 800 having the light-transmissive members 83 with a symmetrical height distribution with respect to the center thereof can be easily obtained. The plurality of cylindrical lenses of the cylindrical lens portion 10 may be arranged with a symmetrical height distribution with respect to the center of the array direction to realize a desired light distribution.

Figure 12B:
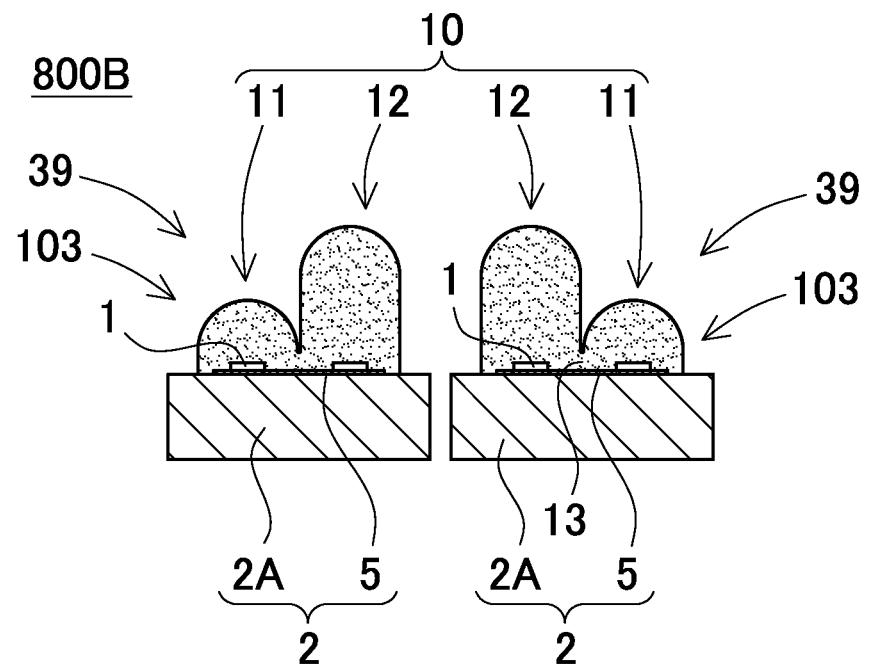
FIG. 12B is a schematic cross-sectional view of a light emitting device according to the eighth embodiment.

In the light emitting device 800A shown in FIG. 12A, a form in which two light emitting units 9 each including the cylindrical lens portion 10 having an array of three or more cylindrical lenses is shown, but the light emitting device may include a total of three or more cylindrical lenses of the light-transmissive members of the plurality of light emitting unit. FIG. 12B is a schematic cross-sectional view of a light emitting device 800B according to the eighth embodiment. In the light emitting device 800B shown in FIG. 12B, the light-transmissive member 103 of each of the light emitting units 39 includes a cylindrical lens portion 10 having two cylindrical lenses, and the light emitting device 800B include a total of three or more cylindrical lenses (in FIG. 12B, the light emitting device 800B includes four cylindrical lenses). In each of the light emitting units 39 of the light emitting device 800B, of the two cylindrical lenses of the cylindrical lens portion 10, one cylindrical lens (i.e., a second cylindrical lens portion 12) has a greater height, and the other cylindrical lens (i.e., a first cylindrical lens portion 11) has a height smaller than the height of the second cylindrical lens portion 12. Further, the two light emitting units 39 are arranged such that the second cylindrical lens portions 12 face each other to constitute the light emitting device 800B.

In the eighth embodiment, the light emitting device in which two light emitting units are arranged is illustrated, but three or more light emitting units may be arranged in the light emitting device. For example, three light emitting units each including a light-transmissive member that includes one cylindrical lens are provided, of which, a light emitting unit having the greatest height is arranged in the center of the three light emitting units and the other two light emitting units are arranged both sides of the light emitting unit in the center. As described above, in the light emitting device constituted by a plurality of light emitting units, the number of light emitting units that are arranged, or the number of light emitting element rows and cylindrical lens portions in each of the light emitting units may be appropriately changed, which allows for obtaining a light emitting device with desired light distribution.

In the light emitting device 800A, 800B shown in FIG. 12A, FIG. 12B, respectively, each of the light emitting units includes at least one first cylindrical lens portion 11 and the second cylindrical lens portion 12, which allows inclination in light intensity distribution curve of the light emitting device 200 in the array direction of the cylindrical lens portions to be gradually changed. Further, with two light emitting units arranged such that the second cylindrical lens portion 12 in one light emitting unit face the second cylindrical lens portion 12 in the other light emitting unit, light intensity distribution curve of the light emitting device in the arrangement direction of the light emitting units can have a protruding portion near the center thereof.

Ninth Embodiment

Figure 13:
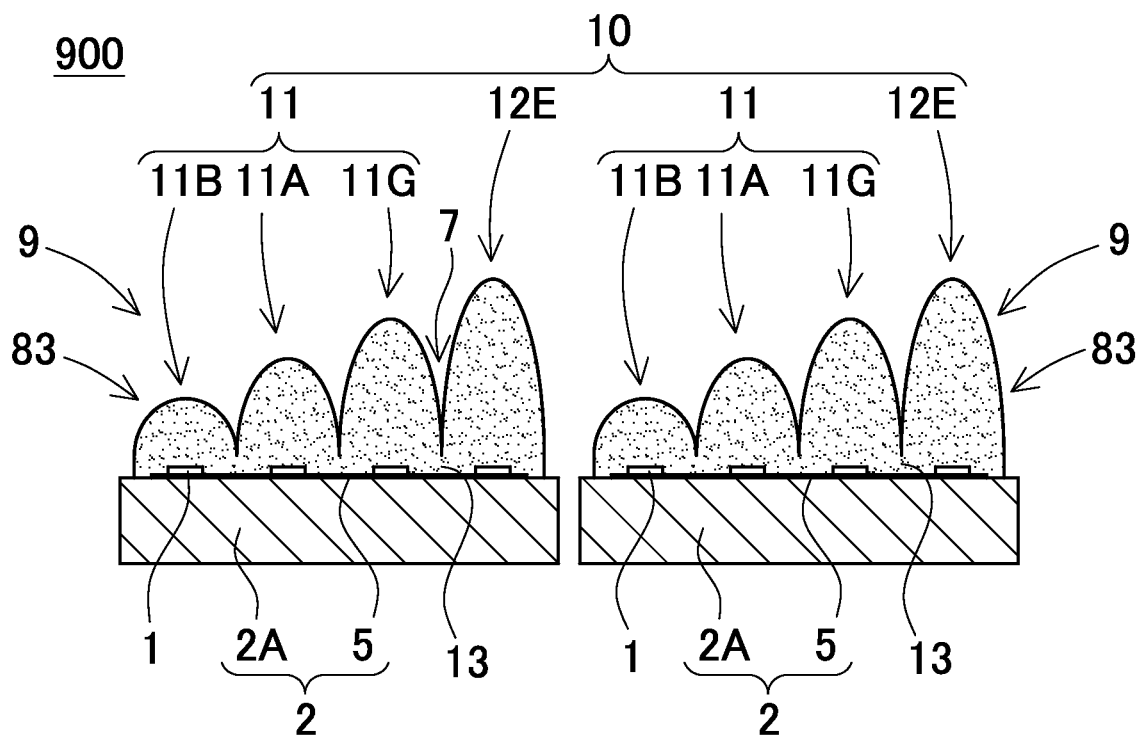
FIG. 13 is a schematic cross-sectional view of a light emitting device according to a ninth embodiment.

FIG. 13 is a schematic cross-sectional view of a light emitting device 900 according to a ninth embodiment. The light emitting device 900 in the ninth embodiment is constituted by a plurality of light emitting units 9 as in the light emitting device 800A and the light emitting device 800B, but arrangement of the light emitting units 9 is different from both of the light emitting device 800A and the light emitting device 800B. In the light emitting device 900 shown in FIG. 13, two light emitting units 9 are arranged such that a second cylindrical lenses 12E of one of the light emitting units 9, which has the greatest height and is arranged at one end side of the one of the light emitting units 9, faces a first cylindrical lenses 11B of the other light emitting unit 9, which is arranged at the other end side of the other light emitting unit 9.

In the light emitting device 900, each of the light emitting units 9 includes first cylindrical lens portions 11 and the second cylindrical lens portion 12, which allows inclination in light intensity distribution curve of the light emitting device 900 in the arrangement direction of the cylindrical lens portions to be gradually changed. Further, in the ninth embodiment, with a second cylindrical lens 12E of a light emitting unit 9 at the left side and a second cylindrical lens 12E of a light emitting unit 9 at the right side in FIG. 13, light intensity distribution curve of the light emitting device 900 in the arrangement direction of the light emitting units can have two protruding portions.

In the ninth embodiment, three or more light emitting unit may be used to obtain a light emitting device that exhibit light intensity distribution curve having three or more protruding portions. Further, appropriate adjustment of height and number of the second cylindrical lens portions and the first cylindrical lens portions in the light emitting units that are arranged allows for obtaining a desired light intensity distribution curve.

Each of the light emitting units 9 as described above includes a substrate 2, a plurality of light emitting elements 1 arranged in a plurality of light emitting element rows on the substrate 2, and a light-transmissive member 83 including the cylindrical lens portion 10 including an array of the plurality of cylindrical lenses arranged parallel to each other along the light emitting element rows so that each of the cylindrical lenses is on one of the light emitting element rows. Each of the light emitting units 39 as described above each includes a substrate 2, a plurality of light emitting elements 1 arranged in a plurality of light emitting element rows on the substrate 2, and a light-transmissive member 103 including the cylindrical lens portion 10 including an array of at least one cylindrical lens arranged parallel to each other along the light emitting element rows so that each of the cylindrical lenses is on one of the light emitting element rows. The light emitting element rows are arranged at substantially uniform intervals. The cylindrical lens portion 10 includes the first cylindrical lens portion 11 and the second cylindrical lens portion 12 that have a height different from the cylindrical lens portion 11. The second cylindrical lens portion 12 has a height greatest of the cylindrical lens portion 10, and is preferably arranged at one of outermost sides of the array of the cylindrical lenses.

In the present specification, when a total length of the plurality of cylindrical lens portions 10 in the arrangement direction is assumed to be 100, and one end of the cylindrical lens portion 10 in the array direction is assumed to be 0 while the other end thereof is assumed to be 100, the expression "end portion" of the cylindrical lens portion 10 in the array direction refers to a region corresponding to 0 to 20 or a region corresponding to 80 to 100 at end portions of the cylindrical lens portion 10. More specifically, in the case where the cylindrical lens portion 10 includes three to five cylindrical lenses, the "end portion" of the cylindrical lens portion 10 refers to one of outermost cylindrical lens of the cylindrical lens portion 10. In the case where the cylindrical lens portion 10 includes six or more cylindrical lenses, the "end portion" of the cylindrical lens portion 10 refers to one of outermost cylindrical lenses and at least one of its adjacent cylindrical lenses.

In examples shown in FIG. 12A, FIG. 12B, and FIG. 13, each light emitting unit has the second cylindrical lens portion 12 having cylindrical lens of the greatest height at one end. But, when a plurality of light emitting units is arranged in a light emitting device, the second cylindrical lens portion that is the greatest height in one unit may not necessarily be the second cylindrical lens portion that is the greatest height of the light emitting device, according to the combination of the light emitting units. Further, the number of cylindrical lenses of each of the cylindrical lens portions may not be the same between adjacent light emitting units. Examples of such a case will be described below.

Tenth Embodiment

Figure 14A:
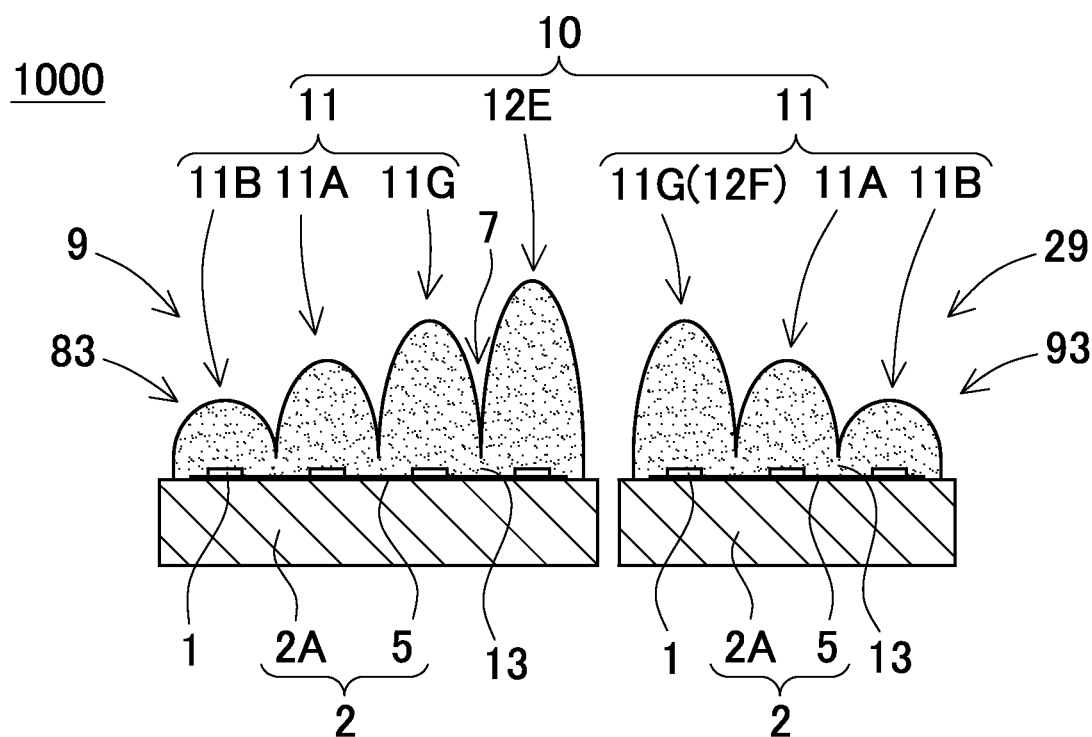
FIG. 14A is a schematic cross-sectional view of a light emitting device according to a tenth embodiment.

FIG. 14A is a schematic cross-sectional view of a light emitting device 1000 according to a tenth embodiment, and shows an example of an arrangement of light emitting units with different number of cylindrical lenses. In the light emitting device 1000 shown in FIG. 14A, a light emitting unit 9 on the left side includes a light-transmissive member 83 including four cylindrical lenses, in which a second cylindrical lens 12E (second cylindrical lens portion) having the greatest height is arranged at one end of the array of the cylindrical lenses on the substrate 2 of the unit 9, and the first cylindrical lens portion 11 is arranged adjacent to the second cylindrical lens 12E so that the heights of the first cylindrical lenses 11G, 11A, and 11B decreases toward the other end from the second cylindrical lens 12E side. Also, a light emitting unit 29 on the right side includes a light-transmissive member 93 including three cylindrical lenses, in which a second cylindrical lens 12F (second cylindrical lens portion) having the greatest height is arranged at one end of the array of the cylindrical lenses on the substrate 2 of the unit 29, and the first cylindrical lens portion 11 is arranged adjacent to the second cylindrical lens 12F so that the heights of the first cylindrical lenses 11A and 11B decreases toward the other end from the second cylindrical lens 12F side. The second cylindrical lens 12F of the light emitting unit 29 at the right side has a smaller height than the second cylindrical lens 12E of the light emitting unit 29 at the left side.

In the light emitting device 1000 in FIG. 14A, the two light emitting units 9 and 29 are arranged such that the second cylindrical lenses 12E and 12F face each other. The second cylindrical lens 12E of the light emitting unit 9 has the greatest height of the light emitting device 1000, and serves as the second cylindrical lens portion 12 of the light emitting device 1000. Meanwhile, the second cylindrical lens 12F of the light emitting unit 29, which is the second cylindrical lens portion 12 of the light emitting unit 29, has a smaller height than the second cylindrical lens 12E of the light emitting unit 9, and thus serves as a first cylindrical lens 11G of the light emitting device 1000.

The light emitting device 1000 shown in FIG. 14A includes the cylindrical lens portion 10 having seven cylindrical lenses, and the height of the cylindrical lens portion 10 is approximately symmetrical with respect to the second cylindrical lens 12E, which is at the center of the seven cylindrical lenses. In the light emitting device 1000, inclination in the light intensity distribution curve in an array direction of the cylindrical lens portion 10 having the plurality of cylindrical lenses can be gradually changed, and further, a protruding portion can be created near the center of the light intensity distribution curve of the light emitting device 1000 in the array direction of the cylindrical lens portion 10.

Eleventh Embodiment

Figure 14B:
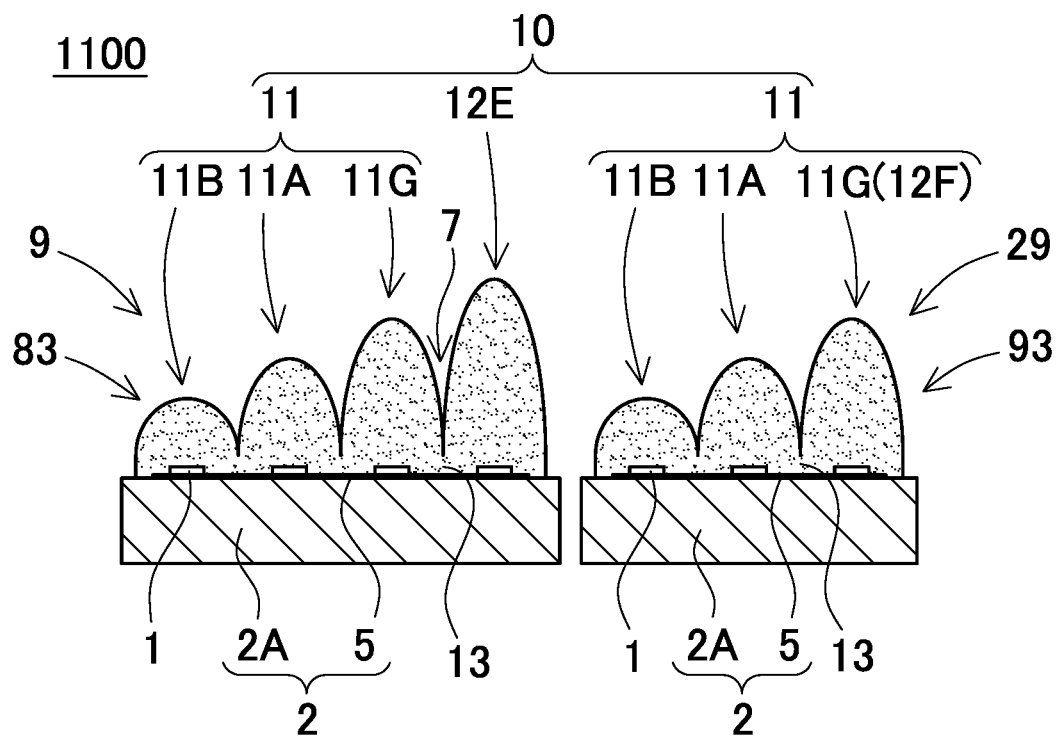
FIG. 14B is a schematic cross-sectional view of the light emitting device according to an eleventh embodiment.

FIG. 14B is a schematic cross-sectional view of a light emitting device 1100 according to an eleventh embodiment. In the light emitting device 1100 shown in FIG. 14B, two light emitting units 9 and 29 are arranged such that the second cylindrical lens 12E of the light emitting unit 29 at the left side of the light emitting device 1000 shown in FIG. 14A faces the first cylindrical lens 11B of the light emitting unit 9 at the right side of the light emitting device 1000 shown in FIG. 14A. Also in the light emitting device 1100, the second cylindrical lens 12E of the light emitting unit 9 has the greatest height of the light emitting device 1100, and thus serves as the second cylindrical lens portion 12E of the light emitting device 1100, while the second cylindrical lens 12F of the light emitting unit 29 serves as a first cylindrical lens 11G of the light emitting device 1100.

The light emitting device 1100 shown in FIG. 14B includes a cylindrical lens portion 10 having seven cylindrical lenses. The cylindrical lenses of the cylindrical lens portion 10 are arranged such that in each of the light emitting units 9, 29, the heights of the cylindrical lenses are increased from the left side in FIG. 14B toward the second cylindrical lens at the right side in FIG. 14B, or vice versa. In the light emitting device 1100, inclination in the light intensity distribution curve in the array direction of the cylindrical portion 10 having the plurality of cylindrical lenses can be gradually changed, and further, two protruding portions having different heights can be created in the light intensity distribution curve.

As shown in FIG. 12A to FIG. 14B according to the eighth embodiment to the eleventh embodiment, a light emitting device having an array of a plurality of light emitting units that are spaced from one another, and a plurality of light emitting elements for emitting ultraviolet light is mounted may facilitate curing of resin or the like compared to, for example, the light emitting device 100 having an integrated structure as shown in FIG. 3A. This is described below in detail.

Figure 18A:
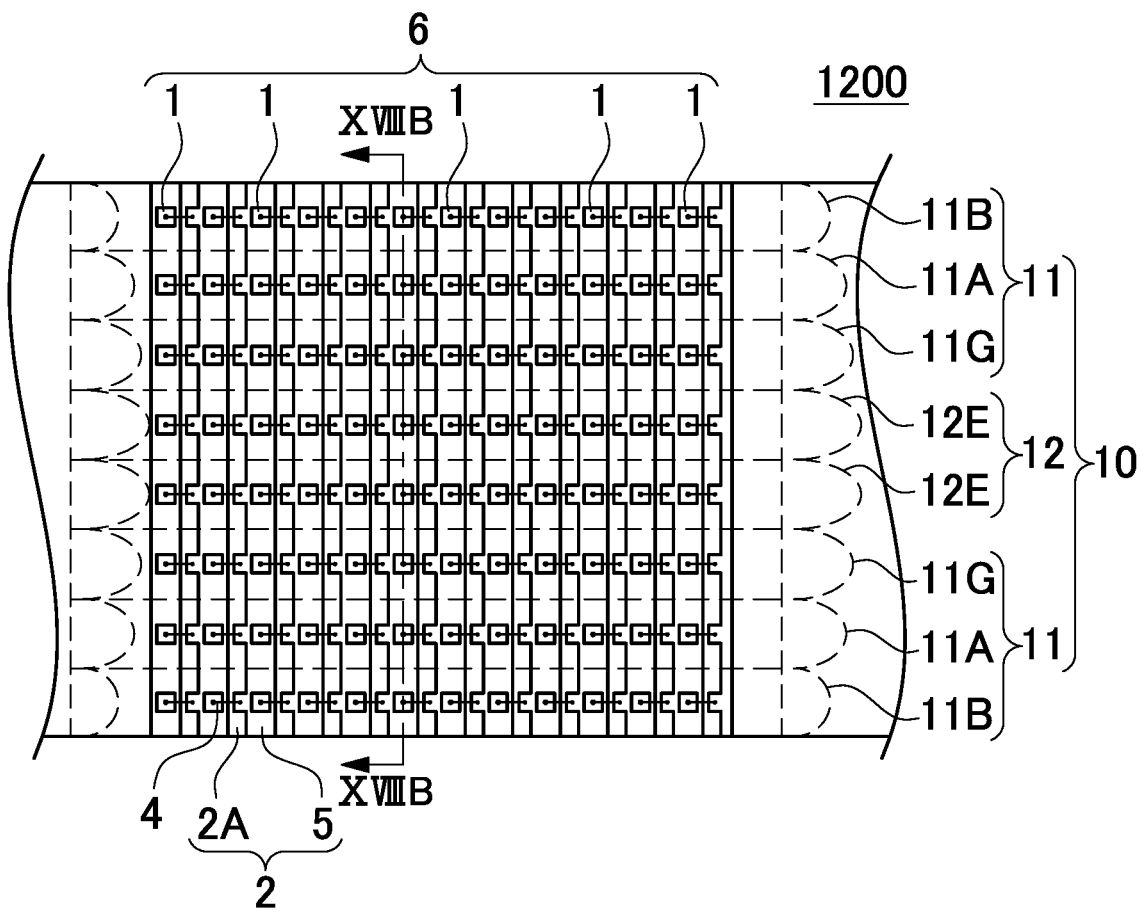
FIG. 18A is a schematic plan view of a light emitting device.
Figure 18B:
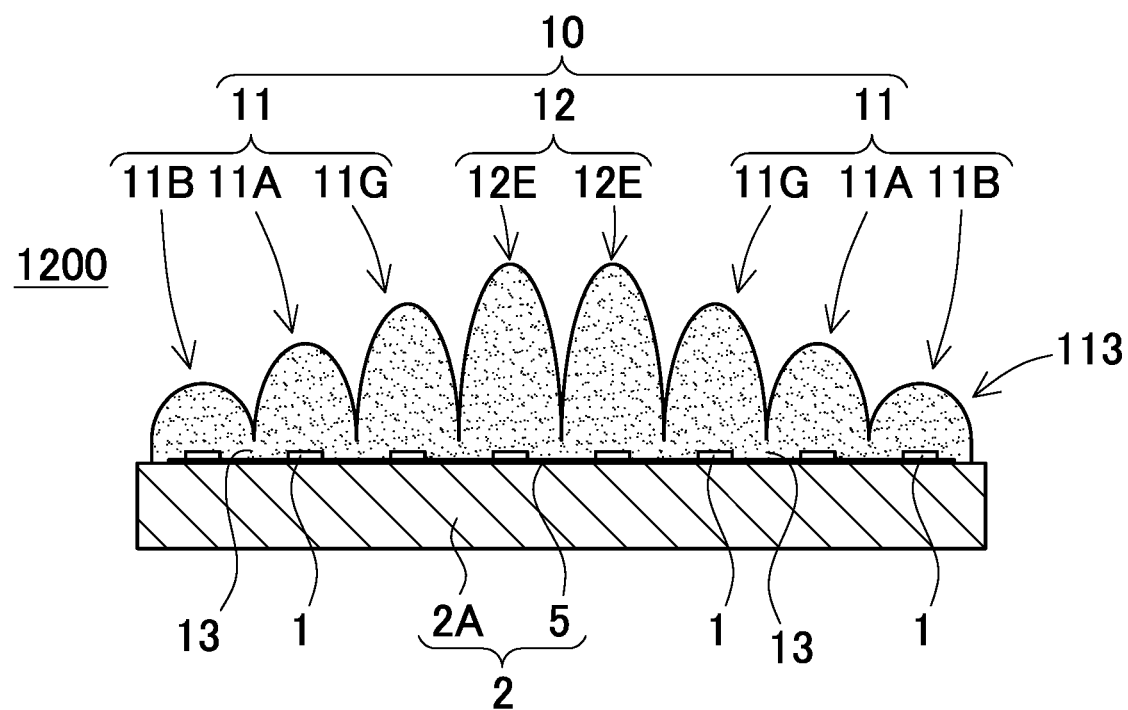
FIG. 18B is a schematic cross-sectional view of the light emitting device shown in FIG. 18A taken along the line XVIIIB-XVIIIB.

FIG. 18A is a schematic plan view of a light emitting device 1200. FIG. 18B is a schematic cross-sectional view of the light emitting device shown in FIG. 18A taken along the line XVIIIB-XVIIIB. In the light emitting device 1200 shown in FIG. 18A and FIG. 18B, eight light emitting element rows 6 are arranged with substantially the uniform intervals on a substrate 2, and includes a light-transmissive member 113 including a cylindrical lens portion 10 having eight cylindrical lenses respectively arranged on corresponding one of the light emitting element rows 6. Other than the light emitting device having an array of a plurality of light emitting units that are spaced from one another, the light emitting device 1200 has an integrated structure. In more detail, the cylindrical lens portion 10 of the light emitting device 1200 has a configuration in which the second cylindrical lenses 12E of the light-transmissive members 83 of the light emitting units 9 shown in FIG. 12A according to the eighth embodiment are connected to each other. Accordingly, the difference between the light emitting device 1200 shown in FIG. 18A and FIG. 18B and the light emitting device 800A shown in FIG. 12A is that each of the substrate and the light-transmissive member are either connected to each other or spaced from each other at the center of the array direction of the cylindrical lens portion 10. Other configurations of these are substantially the same, so that detail explanations thereof may be omitted.

Figure 19:
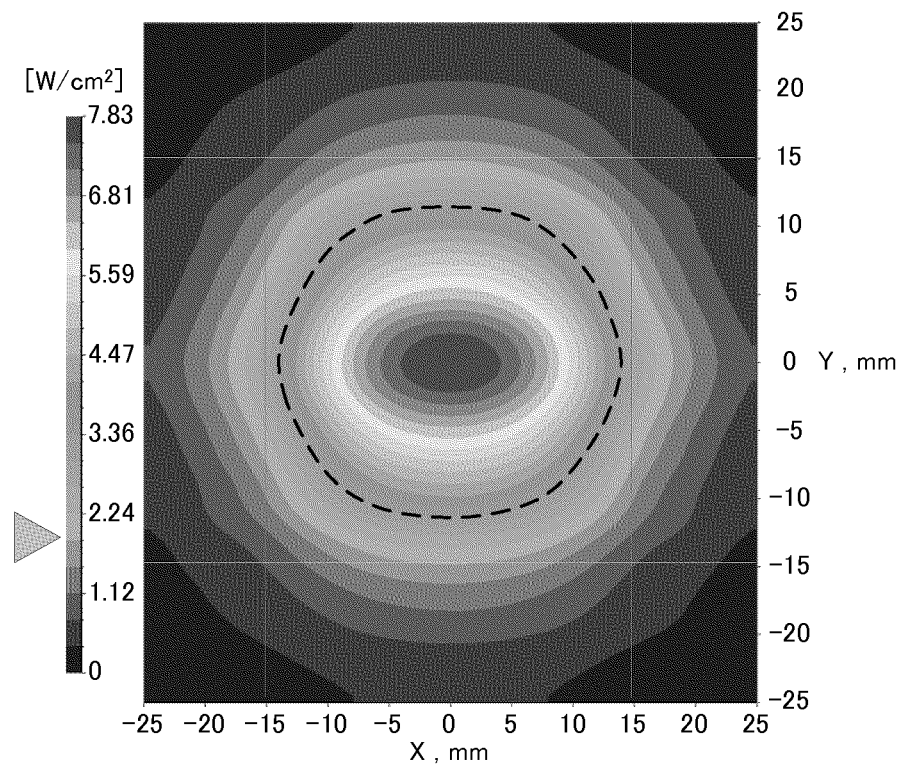
FIG. 19 shows a light radiation intensity distribution of the light emitting device shown in FIG. 18A.
Figure 20:
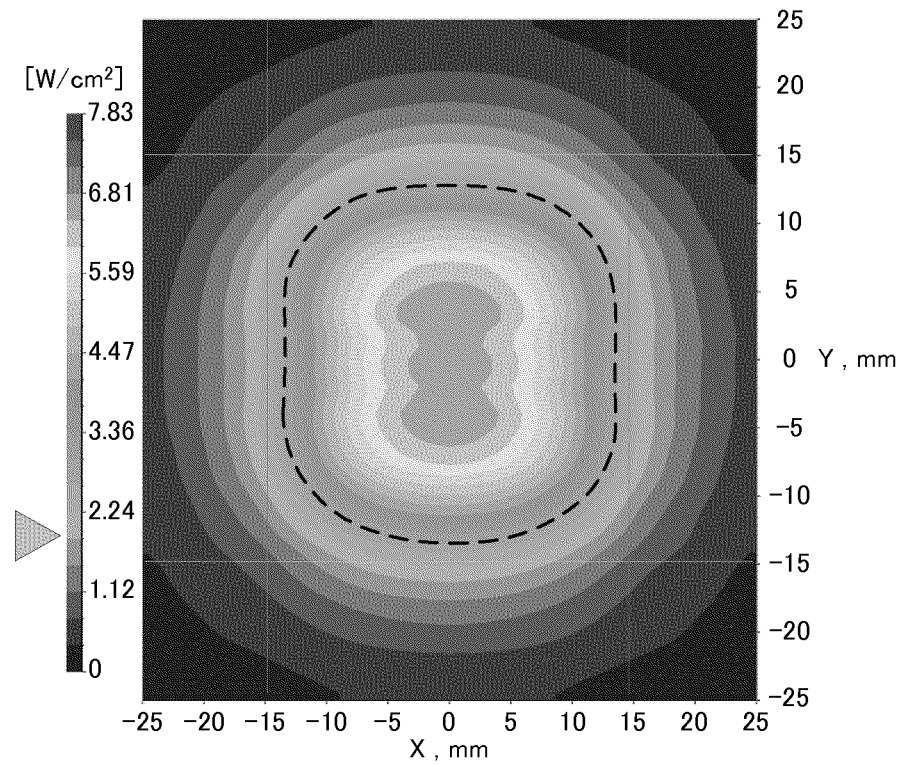
FIG. 20 shows a light radiation intensity distribution in a plan view of the light emitting device shown in FIG. 12A.

FIG. 19 shows a light radiation intensity distribution of the light emitting device 1200 shown in FIG. 18A. FIG. 20 shows a light radiation intensity distribution in a plan view of the light emitting device 800A shown in FIG. 12A. As shown in FIG. 19 and FIG. 20, a peak light radiation intensity of the light emitting device 1200 shown in FIG. 18A formed as a single body is higher than that of the light emitting device 800A shown in FIG. 12A in which the light emitting units 9 are arranged (in other words, cylindrical lens portions 10 of the light emitting device 1200 are spaced from each other). Meanwhile, in FIG. 19 and FIG. 20, the peak light radiation intensity of the light emitting device 800A shown in FIG. 12A in which the light emitting units 9 are arranged has the region of a threshold value for curing ink (e.g., 3 W/cm$^2$) or greater (i.e., a region surrounded by a dotted line in each of FIG. 19 and FIG. 20) that is wider than that of the light emitting device 1200 shown in FIG. 18A. Accordingly, compared with the case of using a light emitting device that is formed as a single body, in the case of using a light emitting device in which a plurality of light emitting units is arranged, time of curing reaction of ink may be increased, so that ink may be securely cured.

Figure 21:
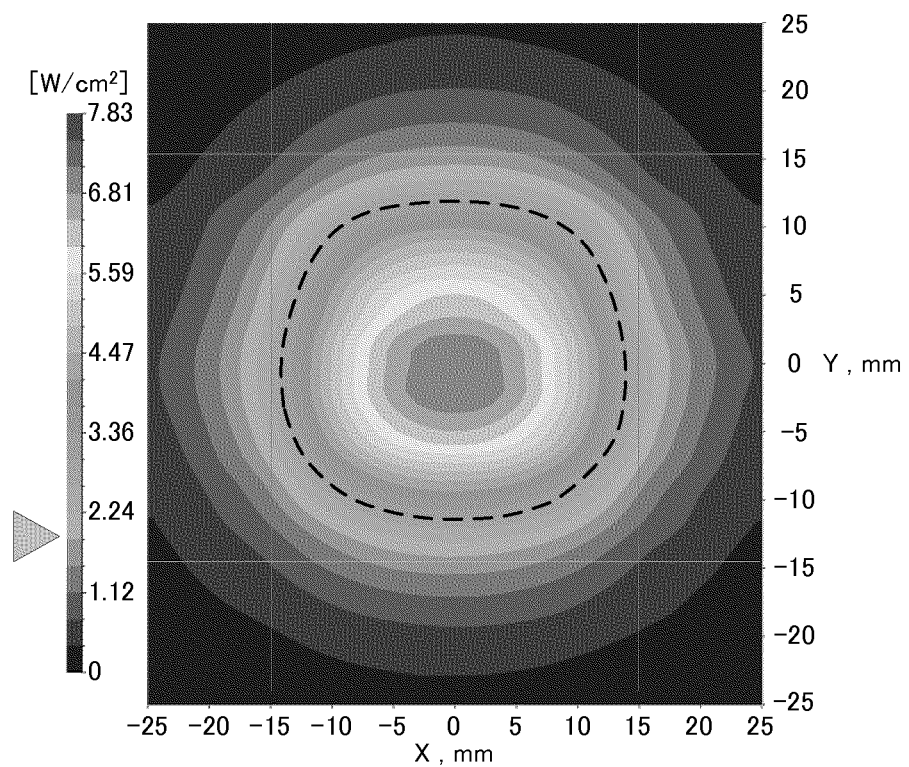
FIG. 21 shows a light radiation intensity distribution in a plan view of the light emitting device shown in FIG. 12A.

FIG. 21 shows a light radiation intensity distribution in a plan view of the light emitting device 800A shown in FIG. 14A. As described above, the light emitting device 1000 shown in FIG. 14A includes the light emitting unit 9 including the light-transmissive member 83, and the light emitting unit 29 including the light-transmissive member 93. The light-transmissive member 83 includes an array of four cylindrical lenses in which the second cylindrical lens 12E having the greatest height is arranged at one outermost side and heights of the cylindrical lenses are decreased from one end side to the other end side in FIG. 14A. The light-transmissive member 93 includes an array of three cylindrical lenses in which heights of the cylindrical lenses are decreased from the second cylindrical lens 12F at one outermost side toward the other outermost side of the array in FIG. 14A. The light emitting unit 9 and the light emitting unit 29 are arranged such that the second cylindrical lens 12E in the light emitting unit 9 faces the second cylindrical lens 12F in the light emitting unit 29. The light emitting device 1000 in FIG. 14A includes an array of one fewer cylindrical lenses of the cylindrical lens portion 10 than cylindrical lenses of the light emitting device 800A in FIG. 12A, and the space between the light emitting units 9 and 29 is located offset from the center of the cylindrical lens portion 10 toward one outermost side or the other outermost side of the cylindrical lens portion 10 of the light emitting device 10000.

In the light radiation intensity distribution shown in FIG. 20 and FIG. 21, a region of a threshold value for curing ink (e.g., 3 W/cm$^2$) or greater (i.e., a region surrounded by a dotted line in each of FIG. 20 and FIG. 21) of the light emitting device 800A shown in FIG. 12A including the light emitting units 9 is wider than that of the light emitting device 1000 shown in FIG. 14A including the light emitting units 9 and 29, while the peak light radiation intensity of the light emitting device 1000 shown in FIG. 14A is higher than that of the light emitting device 800A shown in FIG. 12A. Further, although the light emitting device 1000 shown in FIG. 14A including the light emitting units 9 and 29 includes one fewer light emitting element rows than that of the light emitting device 1200 (i.e., includes seven light emitting element rows), the region of the threshold value for curing ink (e.g., 3 W/cm$^2$) or greater (i.e., a region surrounded by a dotted line in each of FIG. 19 and FIG. 21) in the light irradiation intensity distribution of the light emitting device 1000 is similar to that of the light emitting device 1200, which includes eight cylindrical lenses and eight light emitting element rows and formed as an integrated structure.

Accordingly, with the light emitting device 1000, in which the plurality of light emitting units 9 and 29 is arranged and the space between the light emitting units 9 and 29 is located offset from the center to the one end side or the other end side of the cylindrical lens portion 10 as shown in FIG. 14A, an effect of curing ink may be exhibited substantially as strongly as the light emitting device 1200 having an integrated structure or the light emitting device 800A, in which the space between the light emitting units 9 is located at the center of the cylindrical lens portion 10, although a total number of the light emitting element rows of the light emitting device 1000, which is seven, is smaller than that of light emitting device 1200 or the light emitting device 800A, which is eight.

Light Irradiation Device

Figure 15:
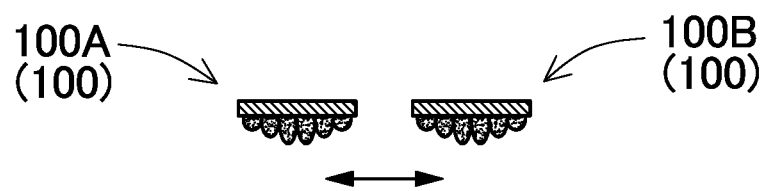
FIG. 15 is a schematic diagram of a light irradiation device including the light emitting device shown in FIG. 1.
Figure 15:
Figure 16:
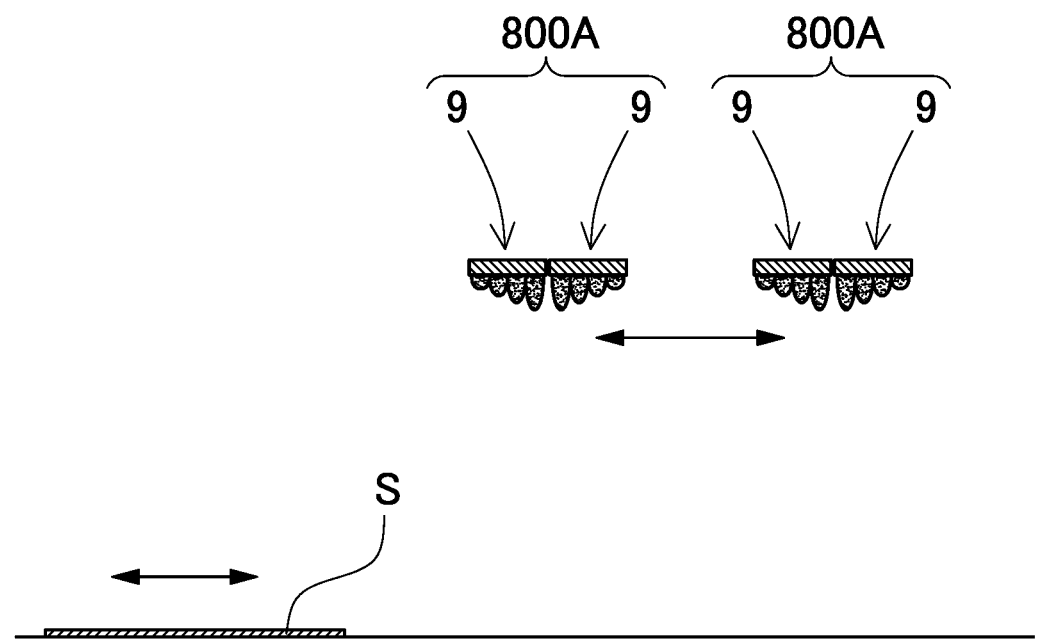
FIG. 16 is a schematic diagram of a light irradiation device including the light emitting device shown in FIG. 12A.
Figure 17:
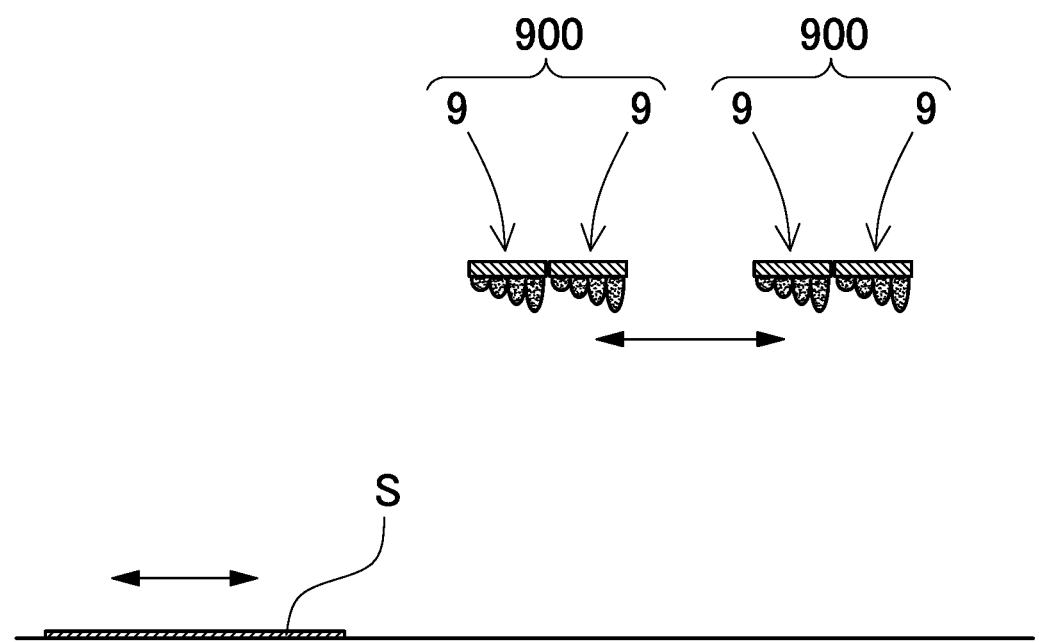
FIG. 17 is a schematic diagram of a light irradiation device including the light emitting device shown in FIG. 13.

A plurality of the light emitting devices as described above that is arranged in a predetermined arrangement may be used as a light irradiation device. FIG. 15 is a schematic diagram of a light irradiation device including the light emitting device 100 shown in FIG. 1. FIG. 16 is a schematic diagram of a light irradiation device including the light emitting device 800A shown in FIG. 12. FIG. 17 is a schematic diagram of a light irradiation device including the light emitting device 900 shown in FIG. 13. In each of FIG. 15 to FIG. 17, two light emitting devices in the light irradiation device are illustrated, but the light irradiation device may include one or three or more light emitting devices. Further, in the light irradiation device, the plurality of light emitting devices is mounted on a substrate or the like, and configured to move in either direction indicated by the double arrow shown below the light emitting devices (in the FIG. 16, left-right direction). Similarly, the irradiation object S is configured to move in either direction indicated by the double arrow shown above the irradiation object S. In the light irradiation device, either one of the light emitting device or the irradiation object S may be configured to move, or both of the light emitting device and the irradiation object S may be configured to move.

The light irradiation device shown in FIG. 15 includes two light emitting devices 100, and the light emitting devices 100 are arranged substantially in parallel to the array of the plurality of cylindrical lenses. The two light emitting devices 100 of the light irradiation device is arranged to face downward so that light emitted from the two light emitting devices is irradiated downward. Further, in the light irradiation device, the plurality of light emitting devices 100 and the irradiation object S is configured to relatively move substantially in parallel to the array of the plurality of cylindrical lenses.

The light irradiation device shown in FIG. 16 includes two light emitting devices 800A The two light emitting devices 800A, are arranged so that the arrays of the plurality of cylindrical lenses of the cylindrical lens portions 10 are aligned in a single direction. In the same manner, the light irradiation device shown in FIG. 17 includes two light emitting devices 900 The two light emitting devices 900, are arranged so that the arrays of the plurality of cylindrical lenses of the cylindrical lens portions 10 are aligned in a single direction. The two light emitting devices 800A and the two light emitting devices 900 are arranged downward so that light emitted from the light devices are irradiated downward, and a relative movement direction of the plurality of light emitting devices 800A and a relative movement direction of the plurality of light emitting devices 900 with respect to the irradiation object S are respectively the same with the arrangement direction of the respective cylindrical lens portions 10.

As shown in FIG. 15 to FIG. 17, with the use of the light emitting devices that includes the cylindrical lens portions 10 as described above, a light irradiation device can emit light of gradually changing intensity to the irradiation object. Further, an arrangement of a plurality of the light emitting devices as described above allows for repetitive irradiation of light of gradually increasing intensity. Accordingly, for example, ink or the like can be surely cured.

Further, in the light irradiation device, at least one of light emitting devices 100 is configured to emit light of different wavelength than that of other light emitting devices 100. For example, as shown in FIG. 15, of the two light emitting devices 100, a first light emitting device 100A and a second light emitting device 100B are arranged such that an irradiation object is irradiated by the first light emitting device 100A and subsequently irradiated by the second light emitting device, and the plurality of light emitting elements of the first light emitting device can have an emission wavelength in a range of 290 nm to 330 nm, and the plurality of light emitting elements of the second light emitting device can have an emission wavelength in a range of 345 nm to 385 nm. More specifically, the plurality of light emitting elements 1 of the first light emitting device 100A can have an emission wavelength of 310 nm, and the plurality of light emitting elements 1 of the second light emitting device 100B can have an emission wavelength of 365 nm. With this arrangement, the irradiation object S, more specifically, inside of ink can be cured by light from the first light emitting device 100A, and then the surface of ink can be gradually cured by light from the second light emitting device 1006. Accordingly, with the light irradiation device, ink can be more securely cured.

The light irradiation devices shown in FIG. 15 to FIG. 17 respectively includes two light emitting devices, but the number of the light emitting devices can be changed as appropriate in accordance with desired light distribution, size of the irradiation object S, etc. Further, in the light irradiation device, the light emitting devices may not only be arranged in the direction that is the same with the array direction of the plurality of cylindrical lens portions, but may also be arranged in a direction that is the same with the extending direction of the cylindrical lens portions.

Obviously, numerous modifications and variations of the present invention are possible in light of the above teachings. It is therefore to be understood that within the scope of the appended claims, the invention may be practiced otherwise than as specifically described herein.

What is claimed is:

1. A light emitting device comprising:
   a substrate;
   a plurality of light emitting diodes arranged in three or more rows of light emitting diodes on the substrate; and
   a light-transmissive member including a cylindrical lens portion having an array of three or more cylindrical lenses arranged parallel to each other, wherein each of the three or more cylindrical lenses extends along and is in direct contact with the light emitting diodes of a respective one of the rows of light emitting diodes;
   wherein the rows of the light emitting diodes are arranged with substantially uniform intervals, and
   wherein the cylindrical lens portion includes:
      first cylindrical lens portions including at least cylindrical lenses at outermost sides of the array, and
      a second cylindrical lens portion arranged at an inner side of the first cylindrical lens portions and including a cylindrical lens that has a height greatest among the cylindrical lenses in the cylindrical lens portion.

2. The light emitting device according to claim 1, wherein the second cylindrical lens portion is arranged at a central region of the array of the cylindrical lenses.

3. The light emitting device according to claim 1,
   wherein the plurality of light emitting diodes are arranged in rows of an odd number of five or more, and
   wherein the second cylindrical lens portion includes a cylindrical lens at a center of the array or at least one cylindrical lens at least one side of both sides of the cylindrical lens at the center.

4. The light emitting device according to claim 1,
   wherein the plurality of light emitting diodes are arranged in rows of an even number of six or more, and
   wherein the second cylindrical lens portion includes at least one cylindrical lens of
      cylindrical lenses defining a valley at the center of the array and
      at least one cylindrical lens at both sides of the cylindrical lenses defining the valley.

5. The light emitting device according to claim 1, wherein the cylindrical lenses are arranged such that heights of the cylindrical lenses are decreased from the second cylindrical lens portion toward an outermost cylindrical lens.

6. The light emitting device according to claim 1, wherein heights of the cylindrical lenses are substantially symmetrical with respect to the center of the array of cylindrical lenses.

7. The light emitting device according to claim 1, wherein the light emitting diodes in each of the rows of the light emitting diodes are arranged at substantially uniform intervals.

8. The light emitting device according to claim 1, wherein the plurality of light emitting diodes is configured to emit ultraviolet light.

9. The light emitting device according to claim 1, wherein lower end sides of adjacent cylindrical lenses are connected to each other.

10. The light emitting device according to claim 1, wherein adjacent cylindrical lenses are spaced from each other.

11. The light emitting device according to claim 1, wherein each of the cylindrical lenses has a cross-sectional shape of a substantially semi-elliptical shape.

12. A light irradiation device comprising: a plurality of the light emitting devices according to claim 1, the light irradiation device configured to irradiate an irradiation object with light emitted from the plurality of the light emitting devices,
   wherein the plurality of light emitting devices are arranged substantially in parallel to the array of the plurality of cylindrical lenses, and
   wherein the plurality of light emitting devices and the irradiation object are configured to relatively move substantially in parallel to the array of the plurality of cylindrical lenses.

13. The light irradiation device according to claim 12, wherein at least one of the light emitting devices is configured to emit light of different wavelength than that of other light emitting devices.

14. The light irradiation device according to claim 13 including:
   a first light emitting device and a second light emitting device arranged such that an irradiation object is irradiated by the first light emitting device and subsequently irradiated by the second light emitting device, and
   the plurality of light emitting diodes of the first light emitting device have an emission wavelength in a range of 290 nm to 330 nm, and the plurality of light emitting diodes of the second light emitting device have an emission wavelength in a range of 345 nm to 385 nm.

15. A light emitting device comprising:
   a plurality of light emitting units; and
   a cylindrical lens portion,
   wherein each of the plurality of light emitting units comprising:
      a substrate,
      a plurality of light emitting diodes arranged in one or more rows of light emitting diodes on the substrate in an arrangement direction of the light emitting units, and
      a light-transmissive member including an array of one or more cylindrical lenses arranged parallel to each other, wherein each of the one or more cylindrical lenses extends along and is in direct contact with the light emitting diodes of a respective one of the one or more rows of light emitting diodes, and
   wherein the cylindrical lens portion includes:

a plurality of first cylindrical lens portions including at least outermost cylindrical lenses of the cylindrical lens portion; and a second cylindrical lens portion arranged at an inner side of the outermost cylindrical lenses and includes a cylindrical lens that has a height greatest among the cylindrical lenses in the cylindrical lens portion.

16. The light emitting device according to claim 15, wherein each of the plurality of light emitting units includes the second cylindrical lens portion at an outermost side of the array of the cylindrical lenses, and wherein two of the plurality of light emitting units are arranged such that the second cylindrical lens portion of the two light emitting units face each other.

17. The light emitting device according to claim 15, wherein the plurality of light emitting diodes is configured to emit ultraviolet light.

18. A light emitting unit comprising:
a substrate;
a plurality of light emitting diodes arranged in a plurality of rows of light emitting diodes on the substrate; and
a light-transmissive member including a cylindrical lens portion including an array of a plurality of cylindrical lenses arranged parallel to each other, wherein each of the plurality of cylindrical lenses extends along and is in direct contact with the light emitting diodes of a respective one of the rows of light emitting diodes,
wherein the rows of light emitting diodes are arranged with substantially uniform intervals,
wherein the cylindrical lens portion includes:
a first cylindrical lens portion, and
a second cylindrical lens portion arranged at one of outermost sides of the array of the cylindrical lenses and including a cylindrical lens having a height that is different from a height of a cylindrical lens of the first cylindrical lens portion and that is greatest among the cylindrical lenses in the cylindrical lens portion.

* * * * *